(12) United States Patent
Komatsu et al.

(10) Patent No.: US 9,580,040 B2
(45) Date of Patent: Feb. 28, 2017

(54) LOWER LIMB PROTECTING AIR BAG

(71) Applicant: TOYODA GOSEI CO., LTD., Kiyosu-shi, Aichi-ken (JP)

(72) Inventors: Takanori Komatsu, Kiyosu (JP); Takeshi Ando, Kiyosu (JP); Hiroki Imaeda, Kiyosu (JP); Tetsuya Ogata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/845,906

(22) Filed: Sep. 4, 2015

(65) Prior Publication Data
US 2016/0068131 A1    Mar. 10, 2016

(30) Foreign Application Priority Data

Sep. 8, 2014    (JP) ................. 2014-182699

(51) Int. Cl.
*B60R 21/233* (2006.01)
*B60R 21/206* (2011.01)
*B60R 21/231* (2011.01)
*B60R 21/2338* (2011.01)

(52) U.S. Cl.
CPC .......... *B60R 21/233* (2013.01); *B60R 21/206* (2013.01); *B60R 2021/23169* (2013.01); *B60R 2021/23316* (2013.01); *B60R 2021/23386* (2013.01)

(58) Field of Classification Search
CPC ............... B60R 21/233; B60R 21/206; B60R 2021/23316; B60R 2021/23169
See application file for complete search history.

(56) References Cited

U.S. PATENT DOCUMENTS

| 5,324,070 | A   |   | 6/1994  | Kitagawa et al. |            |
|-----------|-----|---|---------|-----------------|------------|
| 6,916,039 | B2  | * | 7/2005  | Abe ............ | B60R 21/206 |
|           |     |   |         |                 | 280/729    |
| 7,604,252 | B2  | * | 10/2009 | Heitplatz ..... | B60R 21/206 |
|           |     |   |         |                 | 280/729    |
| 8,408,589 | B2  | * | 4/2013  | Fukawatase .... | B60R 21/206 |
|           |     |   |         |                 | 280/728.3  |

(Continued)

FOREIGN PATENT DOCUMENTS

| JP | H05-208653 A  | 8/1993  |
|----|---------------|---------|
| JP | 2008-126974 A | 6/2008  |
| JP | 2008-265660 A | 11/2008 |

*Primary Examiner* — Darlene P Condra
(74) *Attorney, Agent, or Firm* — Posz Law Group, PLC

(57) ABSTRACT

A lower limb protecting air bag includes: a main body inflation part; an end side inflation part; a bending part configured to bend the end side inflation part to project backward from the main body inflation part in inflation completion; and a connecting element configured to connect together the end side inflation part and the main body inflation part so that the bent state of the end side inflation part in inflation completion is maintained, wherein: the main body inflation part and the end side inflation part are configured to inflate substantially in a plate shape to separate a front side wall disposed on the back side and a back side wall disposed on the front side when the air bag is developed flat; and the bending part includes a seam part formed by superimposing and connecting together the front side wall and the back side wall.

2 Claims, 21 Drawing Sheets

(56) References Cited

U.S. PATENT DOCUMENTS

| | | | |
|---|---|---|---|
| 2008/0122205 A1* | 5/2008 | Imamura | B60R 21/203 |
| | | | 280/730.1 |
| 2011/0175334 A1* | 7/2011 | Miller | B60R 21/206 |
| | | | 280/730.2 |
| 2015/0197210 A1* | 7/2015 | Abe | B60R 21/233 |
| | | | 280/729 |

* cited by examiner

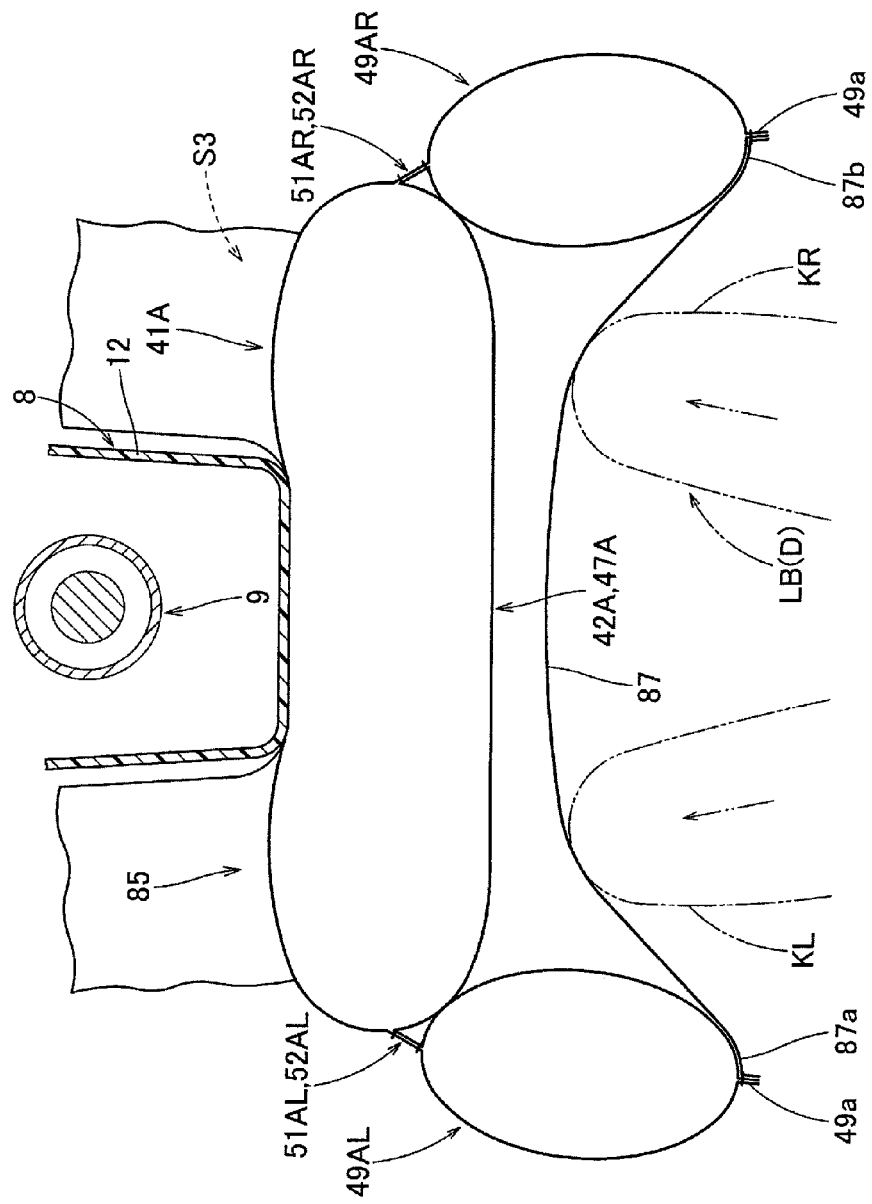

LOWER LIMB PROTECTING AIR BAG

CROSS-REFERENCE TO RELATED APPLICATION(S)

This application is based upon and claims the benefit of priority from Japanese Patent Application No. 2014-182699, filed on Sep. 8, 2014, the entire contents of which are incorporated herein by reference.

BACKGROUND

1. Field of the Invention

The invention relates to a lower limb protecting air bag which is folded and stored in front of an occupant seated in a seat and, when inflation gas is supplied therein, is inflated to cover the front of the lower limbs of the occupant.

2. Description of the Related Art

Conventionally, there are known a lower limb protecting air bag structured to inflate with its two right and left sides projected backward (for example, see JP-A-H05-208653 and JP-A-2008-126974), and an air bag structured to inflate with the two right and left sides and horizontal-direction central side thereof projected backward (for example, see JP-A-2008-265660).

In the lower limb protecting air bag disclosed in JP-A-H05-208653, an air bag itself is structured to inflate three-dimensionally, the two right and left sides are projected backward, and the horizontal-direction central side is recessed relatively.

In the lower limb protecting air bag of JP-A-2008-265660 as well, an air bag itself is structured to inflate three-dimensionally, the two right and left sides and horizontal-direction central sides thereof are projected backward, and a portion intervening between such projecting areas is recessed relatively.

Further, in the lower limb protecting air bag of JP-A-2008-126974, an air bag has a bag-like shape formed by connecting together the outer peripheral edges of its occupant side wall part to be disposed on the occupant side in inflation completion and its vehicle body side wall part to be disposed on the vehicle body side in inflation completion; and, within the air bag, there is arranged a tether for connecting together an occupant side wall and a vehicle body side wall, and the horizontal-direction two end sides in inflation completion are projected backward by the tether.

However, in the lower limb protecting air bags of JP-A-H05-208653 and JP-A-2008-265660, the peripheral edges of a base fabric for forming the air bag must be connected together three-dimensionally, and thus it is not easy to manufacture the air bag. Also, in the lower limb protecting air bag of the JP-A-2008-126974, since the outer shape of the air bag is restricted such that, the two right and left end sides of the air bag in inflation completion are directed backward by the tether disposed within the air bag in inflation completion, it is difficult to restrict the two right and left end sides so as to direct backward greatly.

SUMMARY

The invention aims at solving the above problems. Thus, it is an object of the invention to provide a lower limb protecting air bag in which, while employing a simple structure, in inflation completion, the end of an end side inflation part disposed at least on one of the horizontal-direction ends can be properly directed backward.

According to an aspect of the invention, there is provided a lower limb protecting air bag, folded and stored in front of an occupant seated in a seat, with supply of inflating gas therein, inflatable to cover the front of the lower limbs of the occupant, including: a main body inflation part configured to cover the front of the lower limbs of the occupant in inflation completion; an end side inflation part disposed on at least one of the horizontal-direction ends of the main body inflation part; a bending part, interposed between the main body inflation part and the end side inflation part, configured to bend the end side inflation part to project backward from the main body inflation part in inflation completion; and a connecting element configured to connect together the end side inflation part and the main body inflation part with the bending part between them so that the bent state of the end side inflation part in inflation completion is maintained, wherein: the main body inflation part and the end side inflation part are configured to inflate substantially in a plate shape to separate a front side wall disposed on the back side and a back side wall disposed on the front side when the air bag is developed flat; and the bending part includes a seam part formed by superimposing and connecting together the front side wall and the back side wall.

In the lower limb protecting air bag of the invention, in inflation completion, the end side inflation part disposed on at least one of the horizontal-direction ends of the main body inflation part is bent in the bending part to project backward from the main body inflation part, and the bent state in the bending part is maintained by the connecting element for connecting together the end side inflation part and main body inflation part. In this case, in the lower limb protecting air bag of the invention, since the bending part is constituted of a seam part formed by superimposing and connecting together the front side wall and the back side wall, the end side inflation part can be bent greatly relative to the main inflation part with the bending part as the start point thereof. That is, in the lower limb protecting air bag of the invention, in inflation completion, the end side inflation part can be arranged to project backward greatly from the main body inflation part while directing its end backward. Therefore, in the lower limb protecting air bag of the invention, when, in the oblique collision, off-set collision and the like of the vehicle, an occupant seated in the seat is moving obliquely forward, the lower limbs of the obliquely forward moving occupant can be properly restricted by the end side inflation part.

Therefore, in the lower limb protecting air bag of the invention, while using a simple structure, in inflation completion, the end of the end side inflation part disposed on at least one of the horizontal-direction ends can be properly directed backward.

And, in the lower limb protecting air bag of the invention, since the bending part is constituted of a seam part formed by superimposing and connecting together the front side wall and the back side wall, even in a structure capable of covering the lateral sides of the lower limbs of the occupant in addition to the front thereof, the volume of the air bag can be prevented from increasing, thereby enabling use of a compact inflator having a small gas discharge amount. Therefore, the size of the apparatus itself can be prevented against increase and thus it can be mounted in a narrow mounting space.

Also, in the lower limb protecting air bag of the invention, when the connecting element is constituted of a connecting portion for connecting together the front side wall of the main body inflation part and the front side wall of the end side inflation part, by connecting together the front side walls of the end side inflation part and main body inflation part using the connecting portion, the substantial film length of the front side wall in inflation completion of the air bag can be shortened when compared with the film length of the back side wall. And, due to this film length difference, the end of the end side inflation part is pulled inward in the horizontal direction, whereby, preferably, the end of the end side inflation part can be properly directed backward.

Further, in the lower limb protecting air bag of the invention, the connecting element may also be constituted of a tether disposed on the outside of the air bag for connecting together the end side inflation part and the main body inflation part. In this structure as well, the end of the end side inflation part is pulled inward in the horizontal direction and thus, preferably, the end of the end side inflation part can be properly directed backward.

And, in the lower limb protecting air bag of the invention, when the end side inflation part is arranged on the two left and right sides of the main body inflation part, preferably, in both of the oblique collisions from left front and from right front, the lower limbs of the occupant can be properly protected.

According to another aspect of the invention, there is provided a lower limb protecting air bag, folded and stored in front of an occupant seated in a seat, with supply of inflating gas therein, inflatable to cover the front of the lower limbs of the occupant, including: a main body inflation part configured to cover the front of the lower limbs of the occupant in inflation completion; two end side inflation parts disposed on the two horizontal-direction ends of the main body inflation part; two bending parts, interposed between the main body inflation part and the end side inflation part and, configured to bend the two end side inflation parts to project backward from the main body inflation part in inflation completion; and a flexible tether configured to connect together such horizontal-direction ends of the end side inflation parts as are separated from the main body inflation part with the bending parts between them so that the bent states of the end side inflation parts in inflation completion can be maintained, wherein: the main body inflation part and the end side inflation parts are configured to inflate substantially in a plate shape to separate a front side wall disposed on the back side and a back side wall disposed on the front side from each other when the air bag is developed flat; and the bending parts includes seam parts formed by superimposing and connecting together the front side wall and the back side wall.

In the thus structured lower limb protecting air bag, the end side inflation parts disposed on the two left and right sides of the main body inflation part in inflation completion of the air bag are arranged such that their respective ends are so connected together by the tether as to face backward of the vehicle. And, in inflation completion of the air bag, when the lower limbs of an occupant moving forward toward the air bag come into contact with the tether disposed on the back side of the front side wall, with further forward movement of the occupant, the two ends of the tether are pulled inward in the horizontal direction and, following this, the end side inflation parts are rotated with the bent parts as the start points thereof while directing the ends inward in the horizontal direction. Therefore, the end side inflation parts are arranged to project backward further greatly from the main body inflation part while directing the ends backward, whereby the lower limbs of the occupant can be properly restricted by the end side inflation parts.

Thus, in the thus structured lower limb protecting air bag as well, while using a simple structure, in inflation completion, the end of the end side inflation part disposed at least on one of the two horizontal-direction ends of the main inflation part can be properly directed backward.

Also, in the above structured lower limb protecting air bag as well, since the bent parts are constituted of seam parts formed by superimposing and connecting together the front side wall and back side wall, even in a structure capable of covering the front of the lower limbs of the occupant in addition to the lateral sides thereof, the volume of the air bag can be prevented from increasing, thereby enabling use of a compact inflator having a small gas discharge amount. This can prevent the apparatus itself from increasing in size, thereby enabling smooth mounting of the apparatus in a narrow mounting space.

Further, in the above structured lower limb protecting air bag, since the two end side inflation parts are arranged on the two right and left sides of the main body inflation part, in both of vehicle oblique collisions from left front and from right front, the lower limbs of the occupant can be properly protected.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 21 is a schematic longitudinal section view of the lower limb protecting apparatus using the air bag of the third embodiment, showing a state where, after inflation completion, the air bag receives the lower limbs of an occupant.

DETAILED DESCRIPTION OF THE INVENTION

Figure 1:
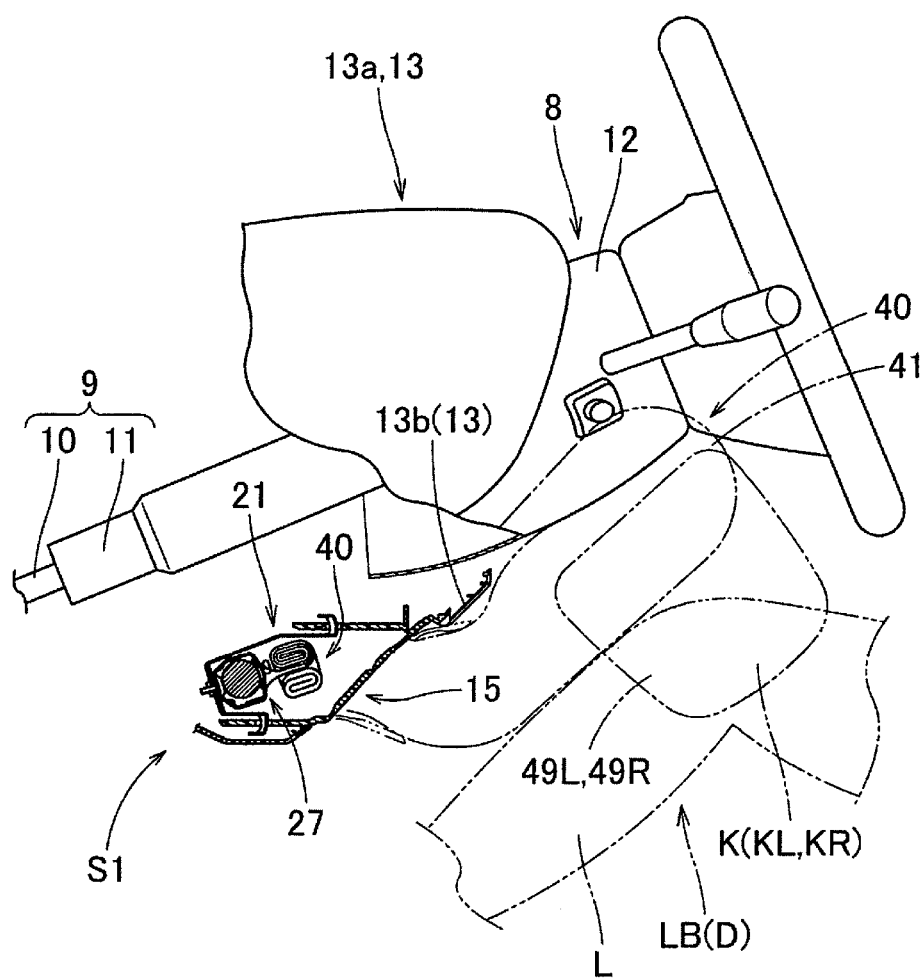
FIG. 1 is a schematic longitudinal section view of a lower limb protecting air bag apparatus using an air bag according to a first embodiment of the invention, showing a state where the apparatus is mounted in a vehicle.
Figure 4:
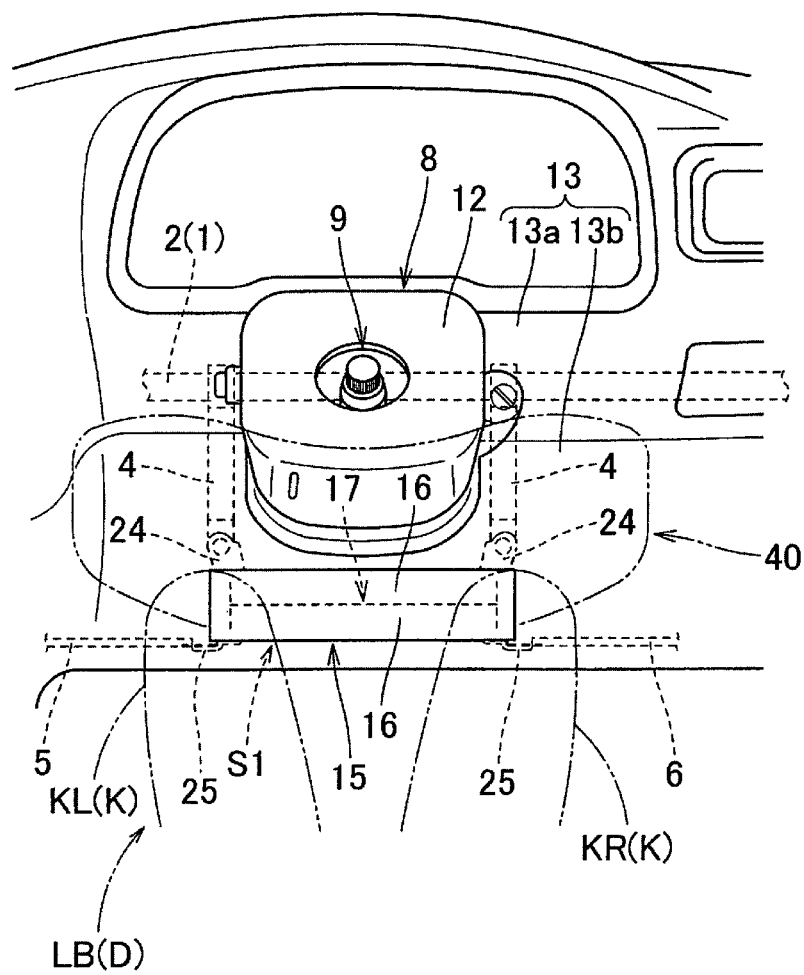
FIG. 4 is a schematic front view of the lower limb protecting air bag apparatus of the first embodiment, showing the using state thereof when viewed from behind the vehicle.
Figure 5:
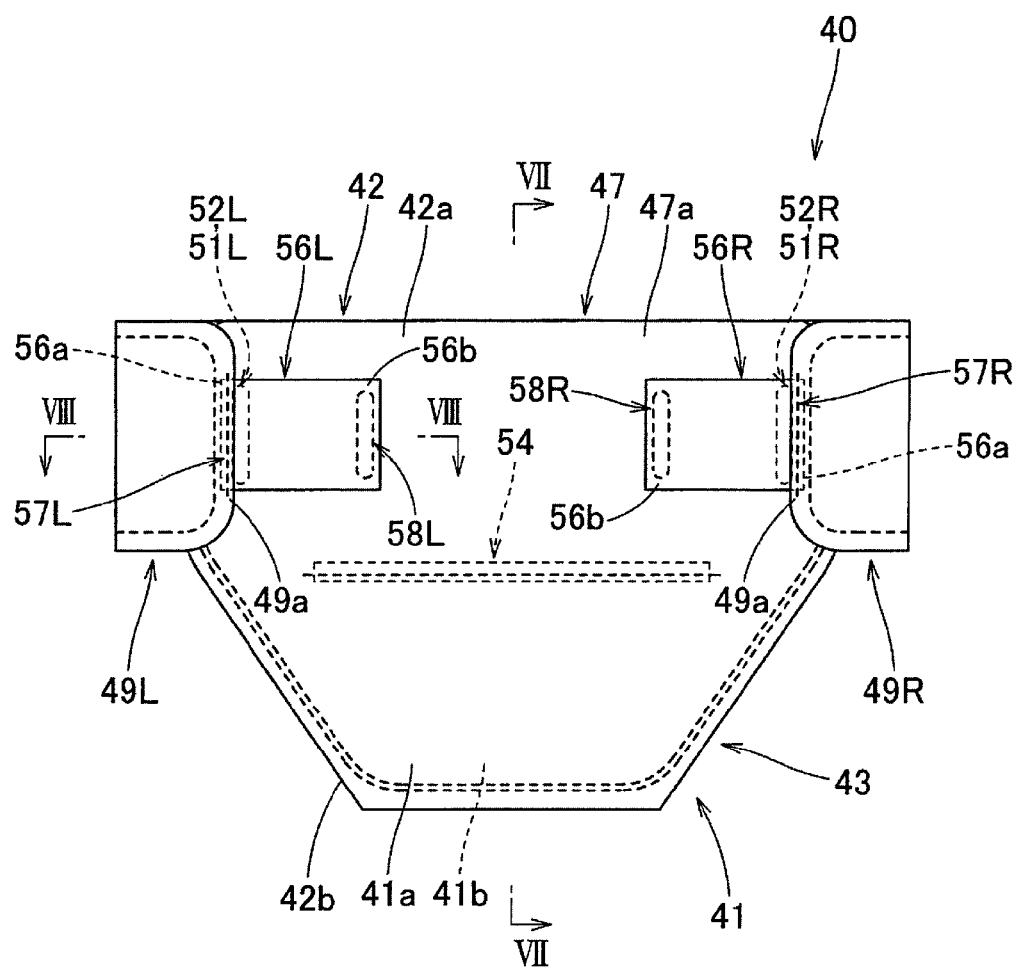
FIG. 5 is a bottom view of the air bag of the first embodiment.

Description is given below of an embodiment of the invention with reference to the drawings. In this embodiment, as shown in FIGS. 1 and 4, description is given of a lower limb protecting air bag (which is hereinafter called simply "air bag") 40 for use in a lower limb protecting air bag apparatus (which is hereinafter called simply "air bag apparatus") S1 disposed below a steering column 8 provided in the front side of a vehicle and in front of a driver D seated in a driver seat. Here, the vertical, horizontal and longitudinal directions in this specification correspond to those of a vehicle when the air bag apparatus S1 is mounted in the vehicle.

Figure 10:
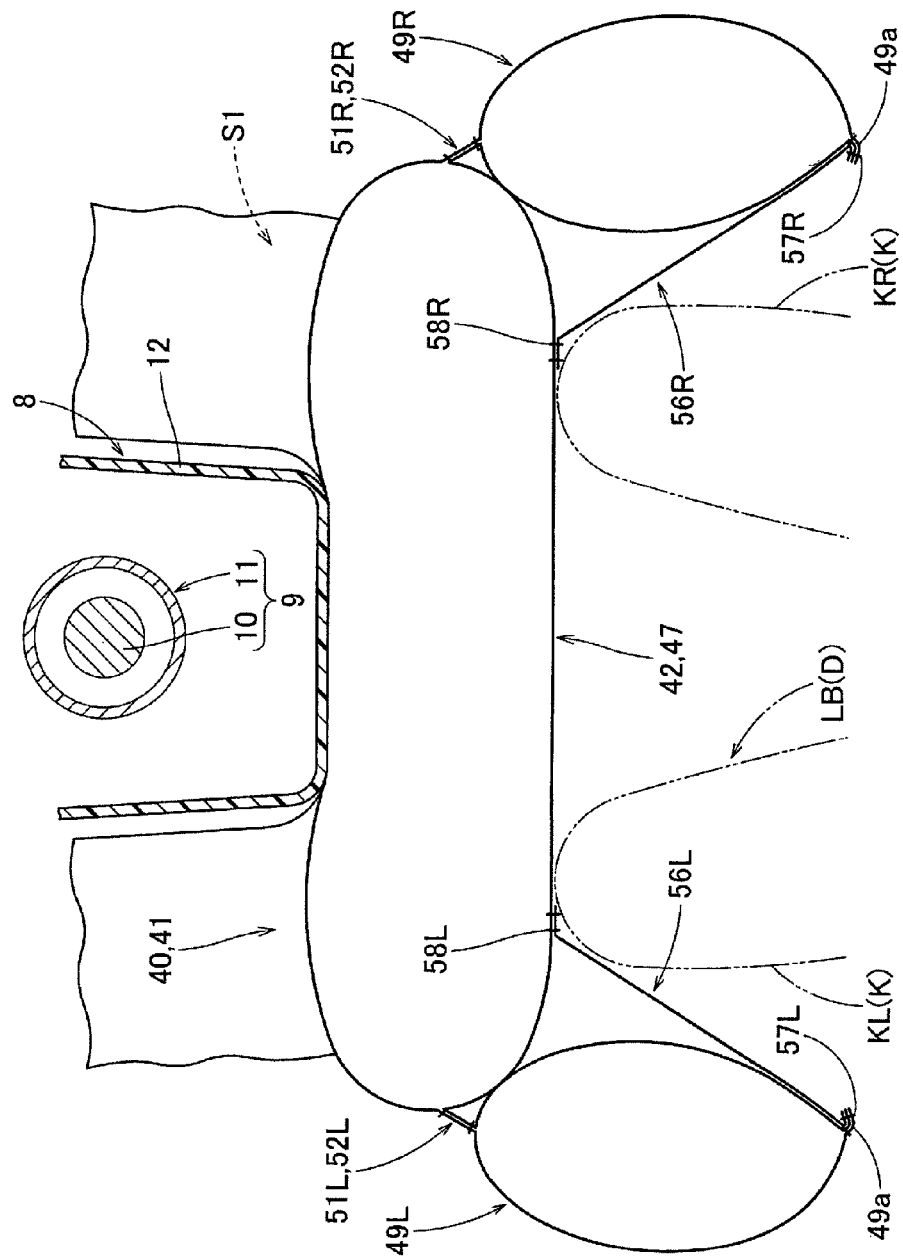
FIG. 10 is a schematic transverse section view of the lower limb protecting apparatus using the air bag of the first embodiment, showing a state where the air bag has completed inflation.

The steering column 8, as shown in FIGS. 1, 4 and 10, includes a column main body 9 and a column cover 12 for covering the outer peripheral side of the column main body 9. The column main body 9, as shown in FIGS. 1 and 10, is constituted of a main shaft 10 and a column tube 11 for covering the periphery of the main shaft 10.

The air bag apparatus S1, as shown in FIGS. 1 to 4, includes a folded air bag 40, an inflator 27 for supplying inflation gas to the air bag 40, a case 21 for storing the folded air bag 40 and inflator 27 and having an opened vehicle back side portion, and an air bag cover 15 for covering the vehicle back side of the opening 21a of the case 21.

Figure 2:
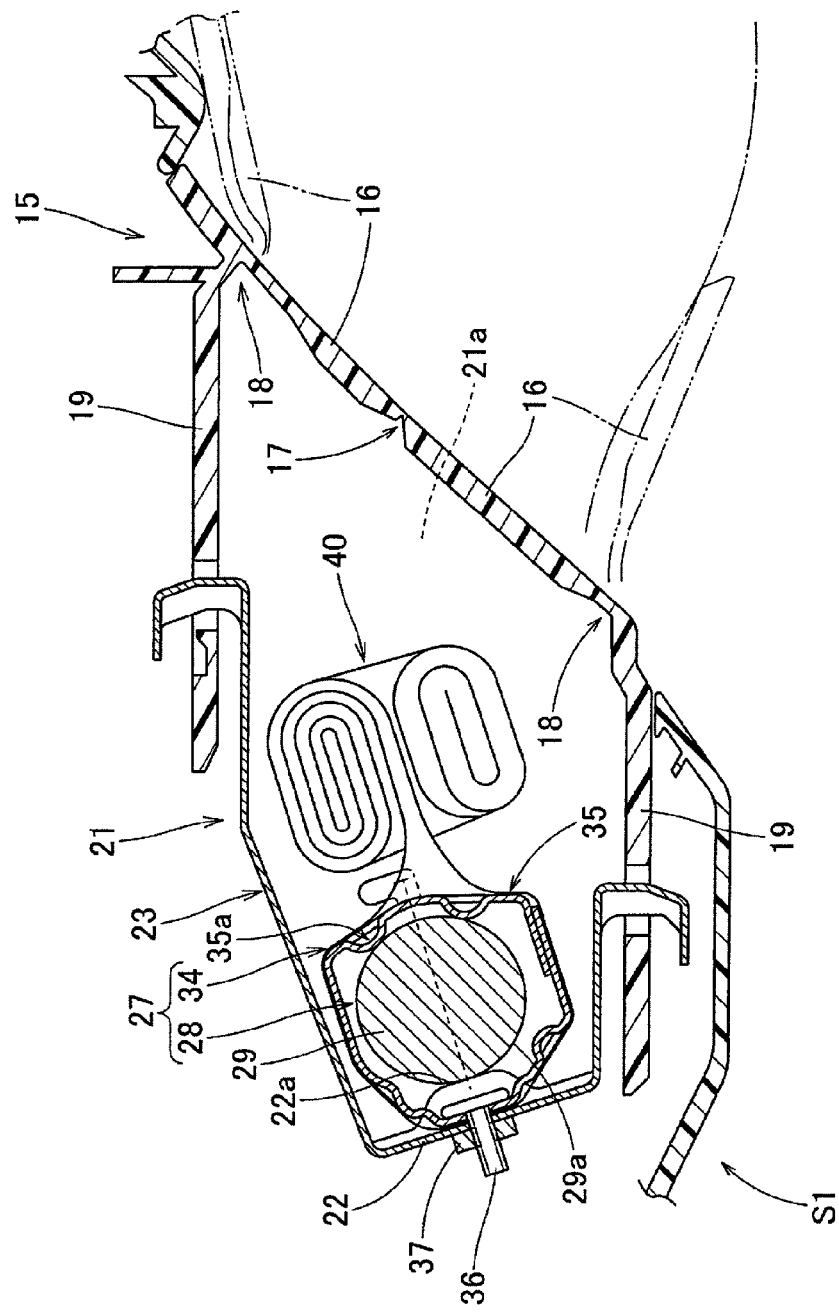
FIG. 2 is a schematic enlarged longitudinal section view of the lower limb protecting air bag apparatus of the first embodiment.
Figure 3:
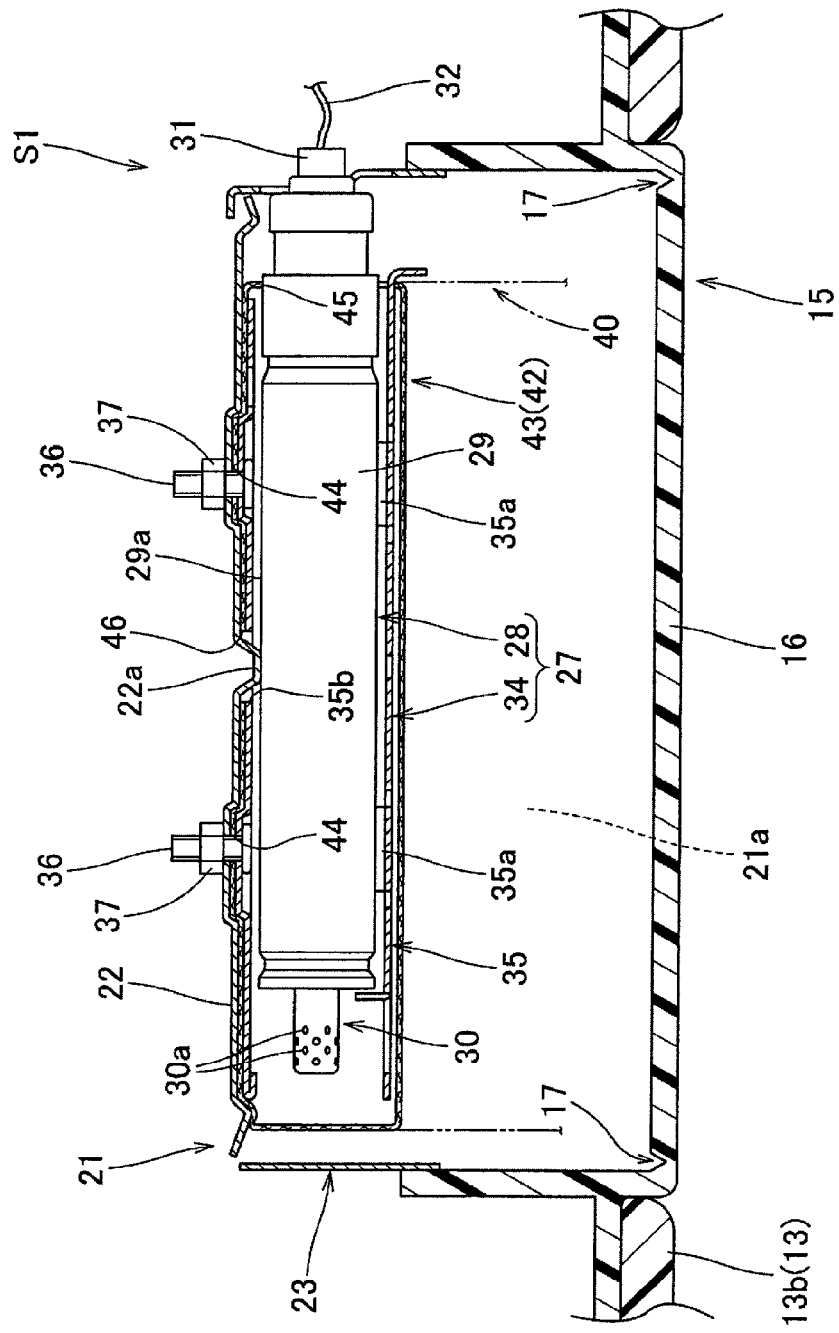
FIG. 3 is a schematic enlarged transverse section view of the lower limb protecting air bag apparatus of the first embodiment.

The air bag cover 15 is formed of polyolefin-based thermoplastic elastomer and is capable of covering the vehicle back side opening 21a of the case 21. As shown in FIGS. 1 to 3, it is disposed on the lower panel 13b of an instrument panel 13 constituted of an upper panel 13a and a lower panel 13b. In this embodiment, it includes a door part 16 arranged to cover the opening 21a of the case 21, and a connecting wall 19 extended forward from the periphery of the door part 16 and connected to the peripheral wall 23 of the case 21. The door part 16 includes, in its periphery, a thin breakage expected portion 17 having a substantially H-like shape when viewed from behind the vehicle and a hinge portion 18 disposed on the two upper and lower sides and serving as the center of rotation when the door part is opened.

The case 21, which is made of a metal plate, as shown in FIGS. 2 and 3, includes a substantially square-shaped bottom wall 22 disposed on the vehicle front side and a substantially square-shaped peripheral wall 23 extending backward from the peripheral edge of the bottom wall 22, while the vehicle back side thereof is opened. In the bottom wall 22, there is formed an insertion hole (not shown) through which a bolt 36 formed in a retainer 34 (to be described later) of an inflator 27 can project. Also, in the bottom wall 22, there is formed a projection 22a projecting backward and contactable with the outer peripheral surface 29a of a main body 29 of the inflator 27 (see FIGS. 2 and 3). Further, in the peripheral wall 23 of the case 21, there are arranged mounting brackets 24 and 25 for mounting the case 21 onto the body 1 side of the vehicle. The mounting brackets 24, 24 to be arranged on the upper side, as shown in FIG. 4, are to be connected to brackets 4, 4 extending from the instrument panel reinforcement 2 on the body 1 side, whereas the mounting brackets 25, 25 to be arranged on the lower side are to be connected to brackets 5, 6 extending from a center brace or a front body pillar (neither of which is shown) on the body 1 side.

The inflator 27, as shown in FIGS. 2 and 3, includes an inflator main body 28 having a substantially cylindrical outer shape and a retainer 34 for holding the inflator main body 28.

The inflator main body 28, as shown in FIG. 3, is formed in a substantially cylindrical shape having an axial direction extending substantially horizontally, and includes a large-diameter main body portion 29 and a small-diameter portion 30 projected from the horizontal-direction one end side (in this embodiment, left end side) of the main body portion 29. The small-diameter portion 30 is smaller in diameter than the main body portion 29 and includes multiple number of gas discharge ports 30a capable of discharging inflation gas. To the other end side (right end side) of the main body portion 29, there is connected a connector 31 with a lead wire 32 for inputting an operation signal connected thereto. The inflator main body 28, in this embodiment, is structured to operate in the front collision, oblique collision and off-set collision of the vehicle.

The retainer 34, as shown in FIGS. 2 and 3, includes a substantially cylindrical hold part 35 for covering the outer peripheral side of the inflator main body 28 and two bolts 36, 36 projected substantially orthogonally to the axial direction of the hold part 35.

The hold part 35 is made of a metal plate and has a substantially cylindrical shape with its axial direction extending along the horizontal direction. It includes, in its portion disposed backwardly of the inflator main body 28, a contact portion 35a which, as shown in FIG. 2, when the apparatus is mounted in the vehicle, comes into contact with the outer peripheral surface 29a of the main body portion 29 of the inflator main body 28. The contact portion 35a, as shown in FIG. 3, is formed in two portions opposed to the bolts 36 on the longitudinal direction side. Also, the hold part 35 includes, in its portion to be situated on the front side of the inflator main body 28 in the mounted state of the air bag on the vehicle and intervening between the bolts 36, 36, a penetration hole 35b through which a projection 22a formed on the bottom wall 22 of the case 21 is inserted (see FIG. 3).

In the air bag apparatus S1 of this embodiment, when the inflator main body 28 is stored into the hold part 35 of the retainer 34 disposed within the folded air bag 40 and the folded air bag 40 is stored into the case 21, the bolts 36 of the retainer 34 are projected from the bottom wall 22 of the case 21 and the nuts 37 are fastened to the bolts 36, thereby mounting the inflator 27 and air bag 40 onto the case 21. Specifically, the inflator main body 28, when fastening the nuts 37, is held in the retainer 34 while it is pinched between the projection 22a of the bottom wall 22 of the case 21 and the contact portions 35a, 35a of the hold part 35 of the retainer 34.

The air bag 40, as shown in FIGS. 5 to 8, in this embodiment, includes a bag main body 41 inflatable when inflation gas is supplied therein, an internal tether 54 disposed within the bag main body 41 and tethers 56L, 56R disposed on the outside of the bag main body 41.

Figure 6:
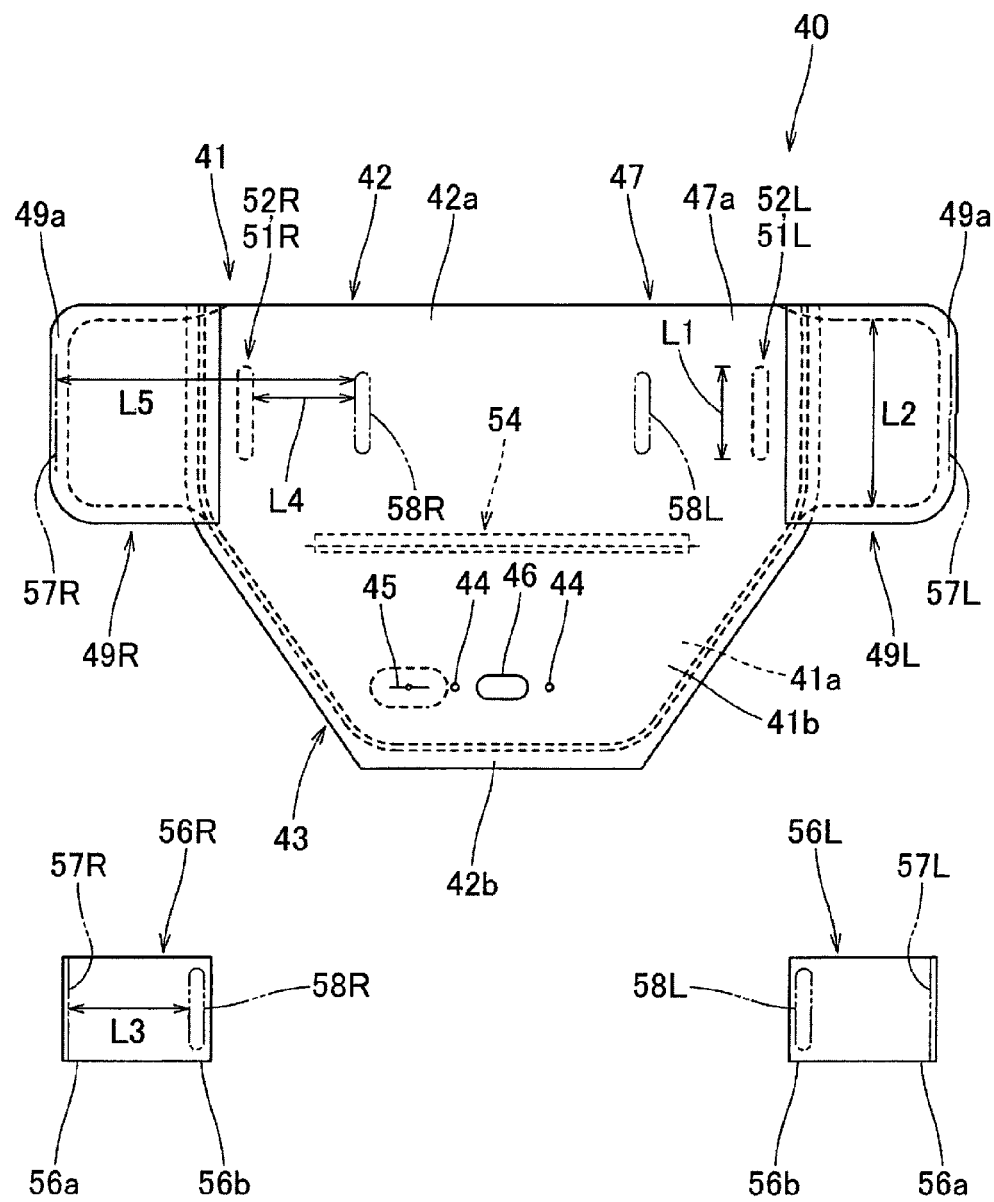
FIG. 6 is a plan view of the air bag of FIG. 5, showing a state where a bag main body and a tether are developed flat.
Figure 9:
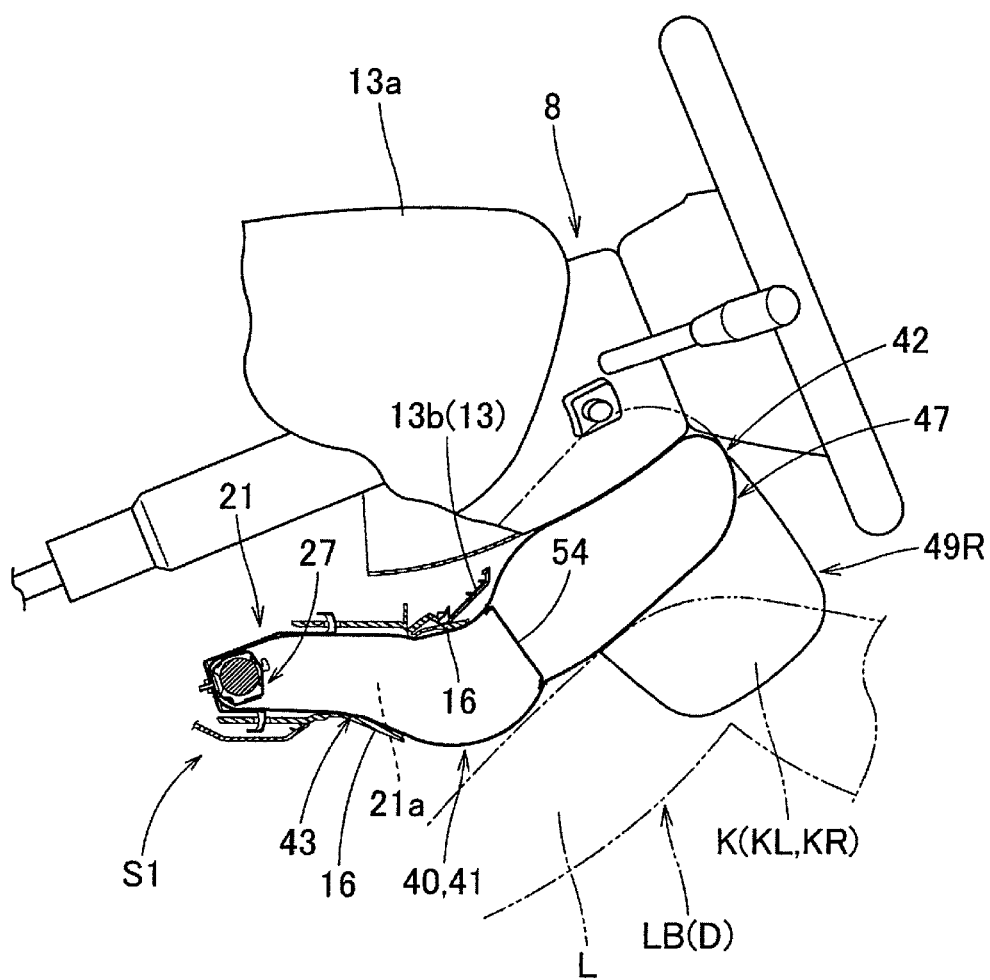
FIG. 9 is a schematic longitudinal section view of the lower limb protecting apparatus using the air bag of the first embodiment, showing a state where the air bag has completed inflation.

The bag main body 41, as shown by two-dot chain lines in FIGS. 1 and 4 and in FIGS. 9 and 10, is arranged to, in inflation completion, cover the front of the lower limb LB of a driver D seated in a driver seat and, in inflation completion, has a substantially rectangular shape capable of protecting of the driver D from the left and right shins L to knees K (KL, KR). Also, the bag main body 41, as shown in FIG. 6, is formed in a bag-like shape by connecting together the respective peripheral edges of its back side wall 41b disposed on the steering column 8 side in inflation completion and its front side wall 41a disposed on the driver D side in inflation completion, while both walls have substantially the same outer shape. That is, the main body inflation part 42 and end side inflation parts 49L, 49R (which are described below) of the bag main body 41, when the bag main body 41 is developed flat (in a state where seam parts 52L, 52R (which are described later) are not formed nor the tethers 56L, 56R are connected together), are allowed to inflate substantially in a plate shape so as to separate the front side and back side walls 41a and 41b from each other.

The bag main body 41, in this embodiment, includes the main body inflation part for covering the lower limbs LB of the driver D in inflation completion, two end side inflation parts 49L, 49R disposed on the two right and left ends of the main body inflation part 42, and bending parts 51L, 51R interposed between the end side inflation parts 49L, 49R and main body inflation part 42 for bending the end side inflation parts 49L, 49R so as to project backward from the main body inflation part 42.

The main body inflation part 42 uses its lower end 42b side in inflation completion as a mounting portion 43 to be mounted onto the case 21 side, while the mounting portion 43 has a narrow width; and its upper end 42a side, in inflation completion, disposed upwardly of the mounting portion 43 is used as a lower limb protection portion 47 capable of protecting the driver D from the shins L to knees K. The lower limb protection portion 47, in inflation completion of the bag main body 41, is interposed between the lower panel 13b or steering column 8 and the knees K or shins L of the driver D so as to cover the front of the driver D from the knees K to shins L. In the lower limb protection portion 47, the horizontal-direction side width dimension increases toward the upper end 47a side, and the horizontal-direction width dimension of the upper end 47a side for protecting the knees K is set for a width dimension capable of covering the front of the left and right knees K(KL, KR) of the driver D. The mounting portion 43 includes, in its upper surface side portion (the portion of the back side wall 41b), two insertion holes 44, 44 for projecting the bolts 36 of the retainer 34, an open slit 45 for inserting the inflator 27 (inflator main body 28 and retainer 34) into the apparatus, and an insertion hole 46 capable of insertion of the projection 22a of the bottom wall 22 of the case 21. The open slit 45, in a state where the bag main body 41 is develop flat, has a linear shape extending substantially along the horizontal direction. The insertion hole 46 is formed in a portion intervening between the insertion holes 44 and 44.

The end side inflation parts 49L, 49R, in this embodiment, are disposed on the upper end 42a side of the main body inflation part 42 in inflation completion and, as shown in FIG. 6, when the bag main body 41 is developed flat, they project leftward and rightward from the neighborhood of the left upward corner and right upward corner of the main body inflation part 42. That is, in the air bag 40 of this embodiment, the end side inflation parts 49L, 49R range from such upper end 47a side portion of the lower limb protection portion 47 as protects the knees K. Specifically, in this embodiment, their upper ends range from the upper end 42a of the main body inflation part 42. In inflation completion of the bag main body 41, they are bent in the bending portions 51L, 51R and are projected backward from the main body inflation part 42 (lower limb protection portion 47) with their ends 49a (the horizontal-direction outside ends when developed flat) facing backward (see FIGS. 8 and 10). That is, they are arranged to cover the lateral sides of the knees K (the left side of the left knee KL, the right side of the right knee KR) of the driver D seated in the driver seat in inflation completion of the bag main body 41 (see FIGS. 9 and 10), and their width dimensions on the vertical-direction side and longitudinal-direction side (the horizontal-direction side when developed flat) in inflation completion is set for such dimensions that, when the driver D serving as an occupant seated in the driver seat is moved obliquely forward in the oblique collision and off-set collision of the vehicle, they can cover the left and right outsides of the knees K of the driver D to thereby enable proper protection of the knees K (KL, KR).

Figure 8:
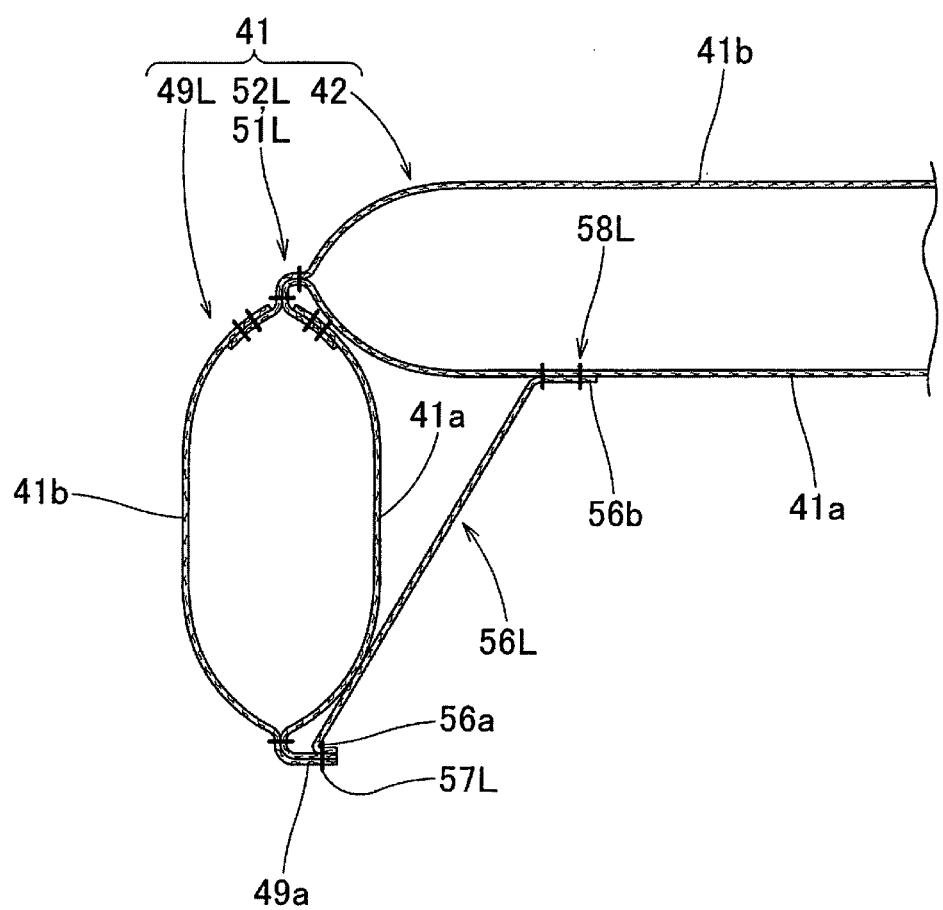
FIG. 8 is a schematic section view of the air bag of FIG. 5 when the air bag is inflated alone, showing the VIII-VIII portion of FIG. 5.

The bending parts 51L, 51R, which bend the end side inflation parts 49L, 49R to project backward from the main body inflation part 42 in inflation completion of the bag main body 41, are constituted of seam parts 52L, 52R interposed between the end side inflation parts 49L, 49R and main body inflation part 42 (see FIGS. 6 and 8). The seam parts 52L, 52R are formed by superimposing and connecting together (in this embodiment, by sewing together using a sewing thread) the front side wall 41a and back side wall 41b. Specifically, they are formed in a linear shape extending substantially vertically and arranged near to the boundary between the end side inflation parts 49L, 49R and main body inflation part 42. More specifically, while their length dimension L1 is set about half of the vertical-direction side width dimension of the end side inflation parts 49L, 49R when developed flat and their vertical center substantially coincides with the vertical center of the end side inflation parts 49L, 49R, they are formed near to the end side inflation parts 49L, 49R on the main body inflation part 42 side (near to the horizontal-direction ends of the main body inflation part 42) (see FIG. 6). In this embodiment, the outer shape of the bag main body 41 including the seam parts 52, 52R is symmetric.

Figure 7:
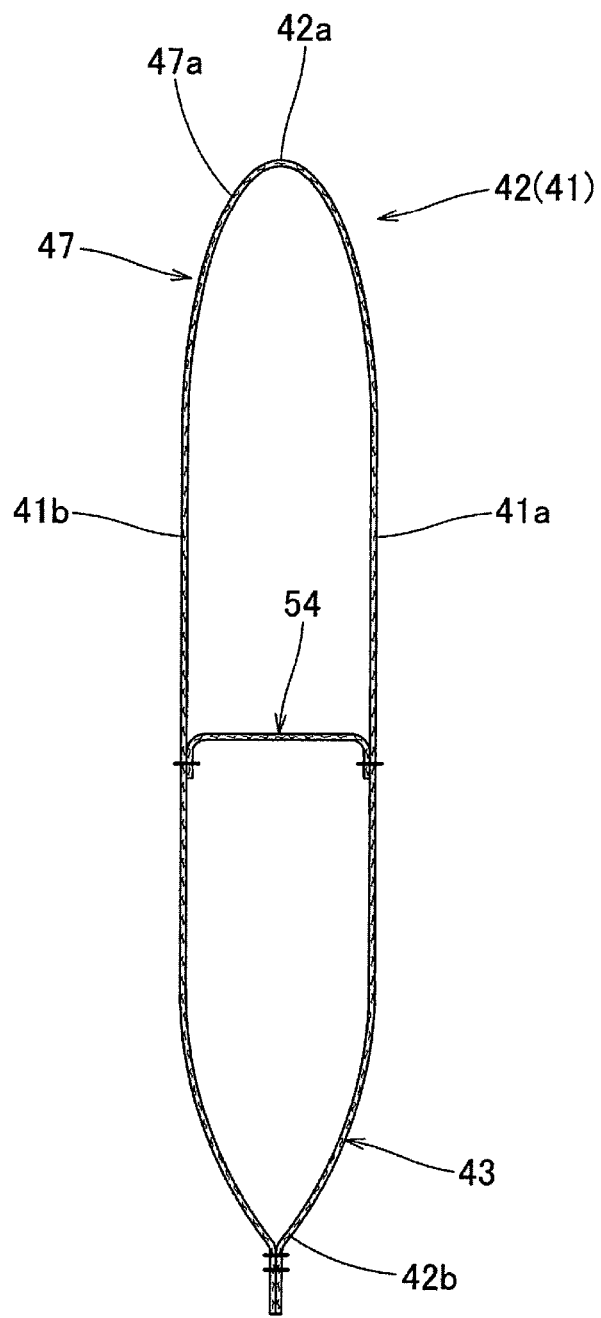
FIG. 7 is a schematic section view of the air bag of FIG. 5 when the air bag is inflated alone, showing the VII-VII portion of FIG. 5.

The internal tether 54 disposed within the bag main body 41 is used to restrict the thickness in inflation completion. It is arranged substantially horizontally in the portion (see FIG. 9) of the bag main body 41 which exists within the lower limb protection 47 of the main body inflation part 42 and, in inflation completion, is disposed to cover the front of the shins L. It is made of a flexible belt-shaped sheet member and, as shown in FIG. 7, and connects together the front side wall 41a and back side wall 41b to, in inflation completion, restrict the distance between the two walls, thereby preventing the shin L protecting portion from inflating excessively greatly.

The tethers 56L, 56R disposed on the outside of the bag main body 41 are arranged as connecting elements for connecting together the end side inflation parts 49L, 49R and main body inflation part 42 in such a manner that the bent state of the end side inflation parts 49L, 49R relative to the main body inflation part 42 in inflation completion can be maintained. They are respectively made of a flexible belt-shaped sheet member and is disposed on the outer surface side (the back surface side in inflation completion of the air bag 40 mounted in the vehicle) of the front side wall 41a providing the outside of the bag main body 41. The base 56a sides thereof are connected to the tip end 49a sides (horizontal-direction outer edge sides) of the end side inflation parts 49L, 49R across the bending parts 51L, 51R, while the tip end 56b sides thereof are connected (sewn) to such positions of the front side wall 41a of the main body inflation part 42 as exist horizontally more inward than the seam parts 52, 52R. Specifically, the width dimension of the tethers 56L, 56R is set about half of the vertical-direction side width dimension of the side inflation parts 49L, 49R when developed flat. The length dimension thereof is set such that, in inflation completion of the bag main body 41, the end side inflation parts 49L, 49R can maintain their bent state relative to the main body inflation part 42 and can project greatly backward from the main body inflation part 42 with the bending parts 51L, 51R as the start points thereof. Specifically, their length dimension, that is, the distance L3 from the connecting parts 57L, 57R with the end side inflation parts 49L, 49R on the base 56a side to the connecting parts 58L, 58R with the main body inflation part 42 on the tip end 56b side is set slightly larger than the distance L4 between the seam parts 52L, 52R of the main body inflation part when developed flat and the connecting part 58L, 58R for connecting the tethers 56L, 56R, and is half of or less than the distance L5 between the connecting parts 57L, 57R forming portions and the connecting parts 58L, 58R forming portions in the bag main body 41 when developed flat (see FIG. 6).

The front side wall 41a, back side wall 41b, internal tether 54, and tethers 56L, 56R constituting the bag main body 41, in this embodiment, are respectively formed of woven fabrics constituted of flexible polyester-based threads, polyamide threads, or the like. Here, in this embodiment, as shown in FIGS. 6 and 8, in the front side wall 41a and back side wall 41b, the portions for forming the end side inflation parts 49L, 49R and the portion for forming the main body inflation part 42 are formed separately from each other. This structure aims at improving the yield of the base fabric constituting the air bag and, of course, the front side and back side walls may also be structured in such a manner that the above portions are formed integrally.

Next, description is given of the procedure for mounting the air bag apparatus S1 of this embodiment onto the vehicle. Firstly, while projecting the bolts 36 from the insertion holes 44, the retainer 34 is stored from the open slit 45 into the air bag 40. The air bag 40 is folded in such a manner that it can be stored into the case 21, and the periphery of the folded air bag 40 is wrapped by a breakable wrapping sheet (not shown) to thereby prevent the folded state against breakage. Next, the inflator main body 28 is inserted through the open slit 45 into the hold part 35 of the retainer 34 within the air bag 40. Then, while projecting the bolts 36 from the bottom wall 22, the folded air bag 40 and inflator 27 are stored into the case 21, and the nuts 37 are fastened to the bolts 36 projecting from the bottom wall 22 to mount the air bag 40 and inflator 27 onto the case 21. Thereafter, by assembling the air bag cover 15 to the case 21, the air bag assembly can be produced. And, the air bag assembly is fixed on the body 1 side using the brackets 4, 5, 6 and the connector 31 with a lead wire 32 extended from the air bag operation circuit connected thereto is connected to the inflator 27. Then, by mounting the instrument panel 13 and an under-cover (not shown), the air bag apparatus S1 can be mounted onto the vehicle.

After mounting of the air bag apparatus S1 on the vehicle, in the front collision, oblique collision or off-set collision of the vehicle, when an operation signal is input into the inflator 27, inflation gas is discharged from the gas discharge ports 30a of the inflator 27 and is supplied into the air bag 40. On receiving the inflation gas therein, the air bag 40 inflates to break the wrapping sheet (not shown) and press the door part 16 of the air bag cover 15, whereby the door part 16, while breaking the peripheral breakage expected portion 17, opens vertically with the hinge portion 18 as its center of rotation. And, the air bag 40 projects toward the back of the vehicle from the opening 21a of the case 21, thereby completing inflation, as shown in FIGS. 9 and 10.

In the air bag 40 of the air bag apparatus S1, in inflation completion, end side inflation parts 49L, 49R disposed on the right and left two end sides of the main body inflation part 42 are so bent in the bending parts 51L, 51R as to project backward from the main body inflation part 42, while the bent states caused by the bending parts 51L, 51R are maintained by the tethers 56L, 56R serving as connecting elements for connecting together the end side inflation parts 49L, 49R and main body inflation part 42. In the air bag 40, since the bending parts 51L, 51R are constituted of the seam parts 52L, 52R formed by superimposing and connecting together the front side wall 41a and back side wall 41b constituting the air bag 40 (bag main body 41), as shown in FIG. 10, the end side inflation parts 49L, 49R can be bent greatly relative to the main body inflation part 42 with the bent parts 51L, 51R as the start points thereof. That is, in the air bag 40, in inflation completion, the end side inflation parts 49L, 49R can be bent backward greatly from the main body inflation part 42 with their ends (tip ends 49a) facing backward: that is, when the driver D serving as an occupant seated in the seat is moved obliquely forward in the oblique collision, off-set collision or the like of the vehicle, the lower limbs LB of the driver D can be properly restricted by the end side inflation parts 49L, 49R. Specifically, since the end side inflation parts 49L, 49R are arranged on the two left and right sides of the upper end 47a side area for protecting the knees K in the lower limb protection portion 47 of the main body inflation part 42, in inflation completion of the air bag 40, the knees K of the driver D moving obliquely forward are restricted by the end side inflation parts 49L, 49R, thereby enabling restriction of the lower limbs LB of the driver D.

Therefore, in the air bag 40 of the first embodiment, while using a simple structure, in inflation completion, the tip ends 49a of the end side inflation parts 49L, 49R disposed on the two left and right end sides can be properly directed backward.

Of course, in the air bag 40 of the first embodiment, in a front collision, the lower limbs LB of the forward moving driver D can be properly protected by the lower limb protection portion 47.

Also, in the air bag 40 of the first embodiment, since the bending parts 51L, 51R are constituted of the seam parts 52L, 52R formed by superimposing and connecting together the front side wall 41a and back side wall 41b, even when the air bag 40 is structured to be able to cover the lateral sides of the lower limbs LB of the driver D in addition to the front side thereof, the volume of the air bag 40 can be prevented against increase, thereby enabling use of a compact inflator 27 having a small discharge quantity of gas. This can prevent size increase of the apparatus S1 itself, thereby enabling smooth mounting thereof even into a narrow mounting space.

Further, in the air bag 40 of the first embodiment, since the connecting elements are constituted of the tethers 56L, 56R disposed on the outside of the air bag 40 (air bag main body 41) and used to connect together the end side inflation parts 49L, 49R and main body inflation part 42, the tip ends 49a of the end side inflation parts 49L, 49R can be pulled by the tethers 56L, 56R so as to face horizontally inward, thereby enabling the tip ends 49a to face backward properly.

Still further, in the air bag 40 of the first embodiment, since the end side inflation parts 49L, 49R are arranged on the two left and right sides of the main body inflation part 42, in both of oblique collisions from left front and from right front, the lower limbs LB of the driver D can be protected properly.

Next, description is given of an air bag 65 according to a second embodiment of the invention. The air bag 65, as shown in FIGS. 11 and 13, includes a bag main body 66 inflatable when receiving inflation gas therein and an internal tether 83 disposed within the bag main body 66.

Figure 12:
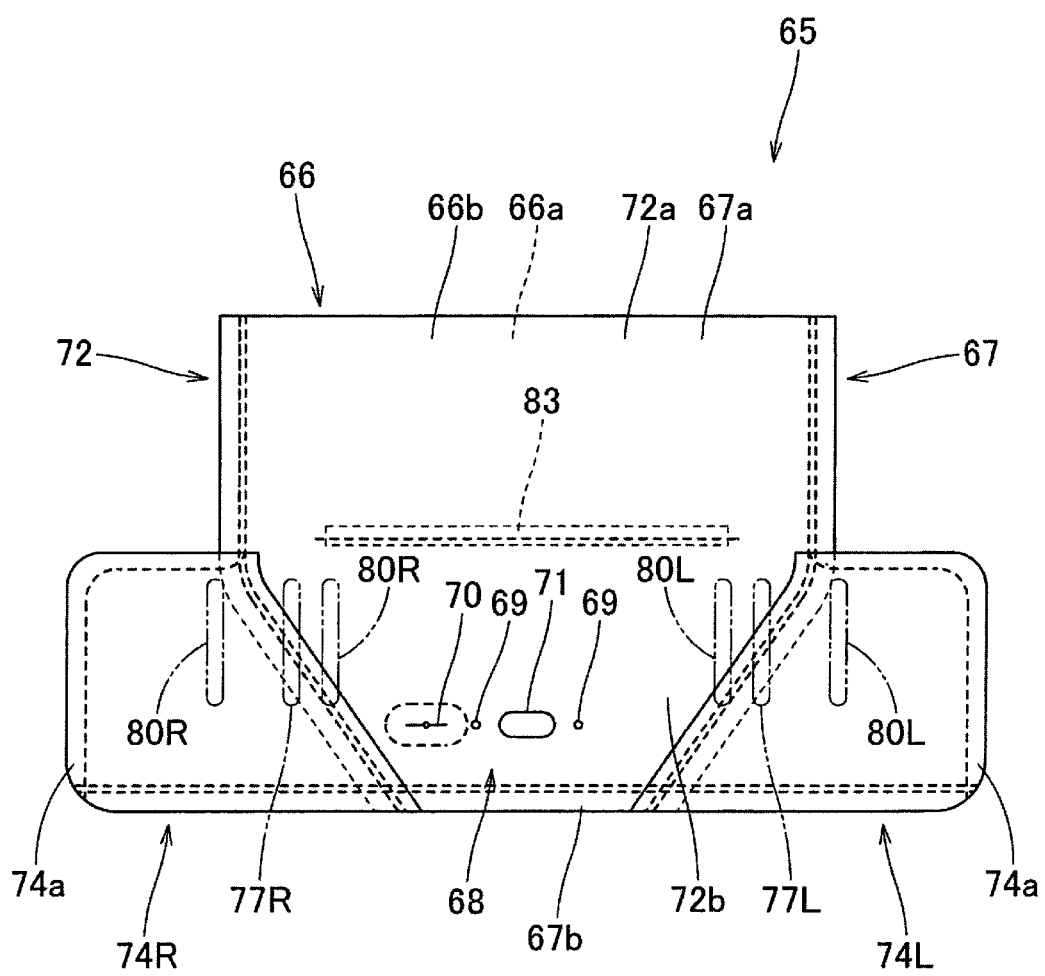
FIG. 12 is a plan view of the air bag of FIG. 11, showing a state where it is developed flat before a seam part and a connecting portion are formed.

The bag main body 66 is structured such that, in inflation completion, it has a substantially rectangular plate-like shape and can protect the driver D seated in the driver seat from the left and right shins L to knees K (KL, KR). Also, the bag main body 66, as shown in FIG. 12, provides a bag-like shape formed by connecting together the peripheral edges of a back side wall 66b to be disposed on the steering column 8 side in inflation completion and a front side wall 66a to be disposed on the driver D side in inflation completion, while the two walls are substantially the same in the outer shape. That is, a main body inflation part 67 and end side inflation parts 74L, 74R (which are described later) of the bag main body 66 are structured such that, when the bag main body 66 is developed flat (in a state where seam parts 77L, 77R and connecting portions 80L, 80R to be described later are not formed), they inflate in such a substantially plate-like shape as to separate the front side wall 66a and back side wall 66b from each other.

Figure 11:
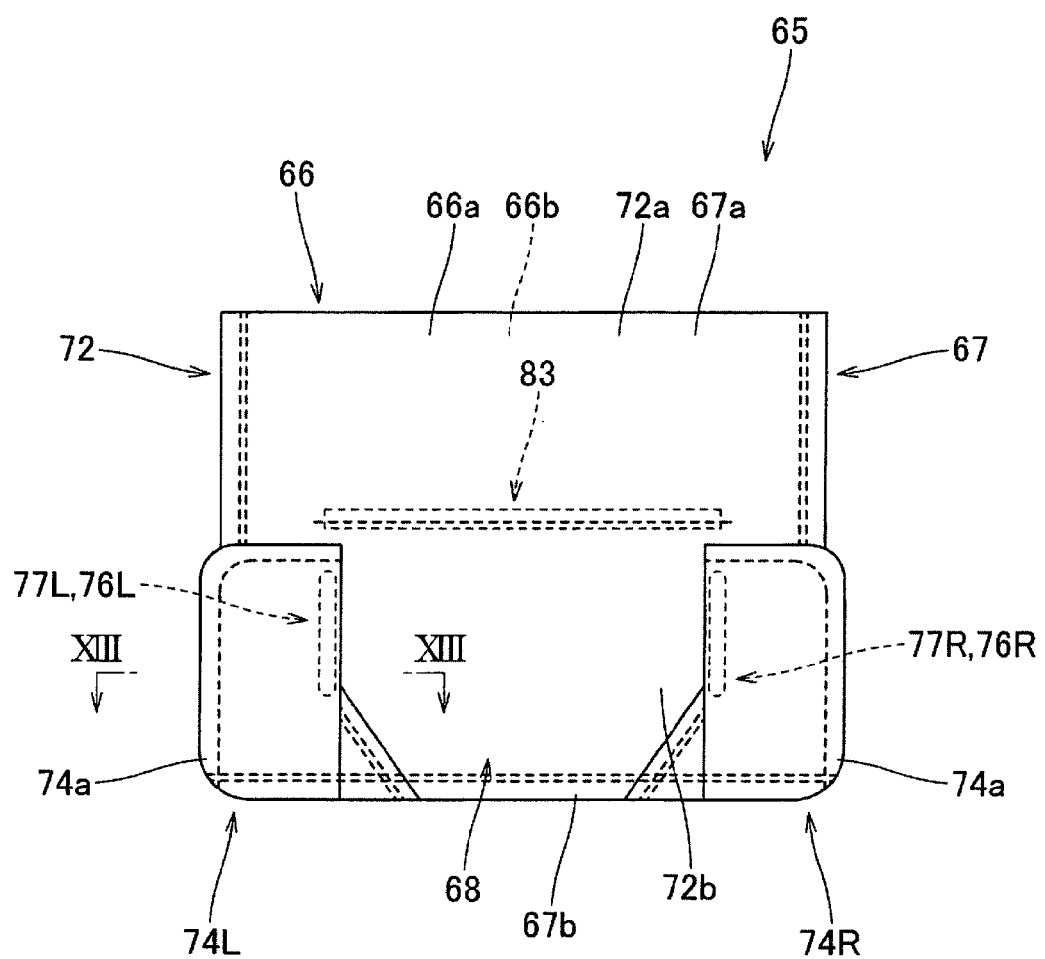
FIG. 11 is a bottom view of an air bag of a second embodiment of the invention.
Figure 13:
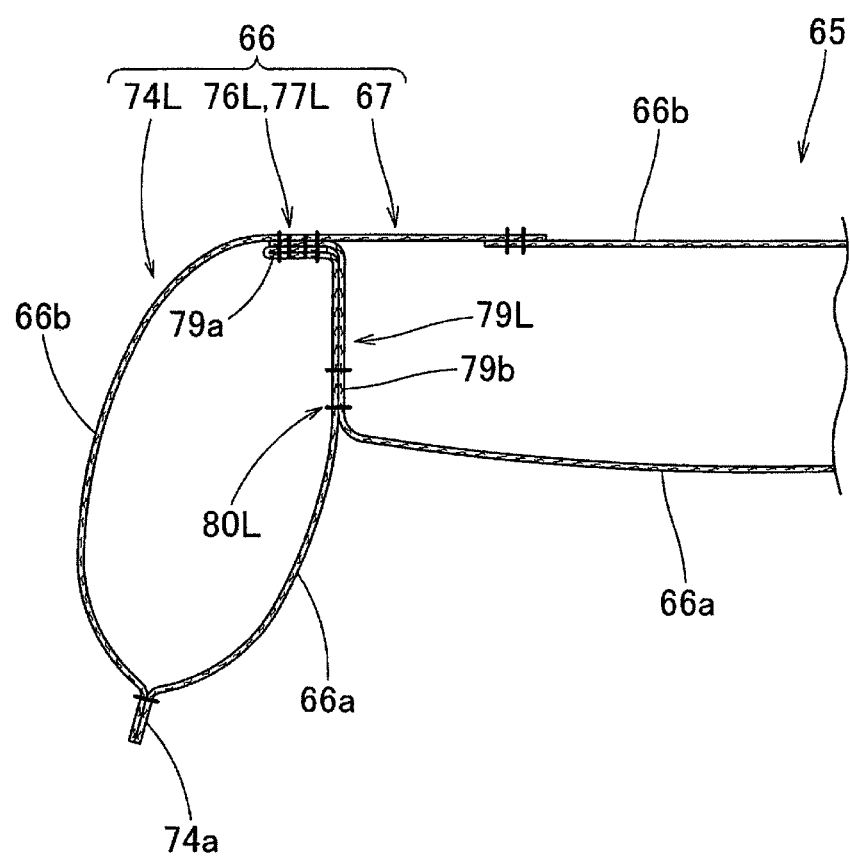
FIG. 13 is a schematic section view of the air bag of FIG. 11, showing the XIII-XIII portion of FIG. 11.

The bag main body 66, as shown in FIGS. 11 to 13, includes a main body inflation part 67 for covering the lower limbs LB of the driver D in inflation completion, two end side inflation parts 74L, 74R disposed on the two left and right end sides of the main body inflation portion part 67, and bending parts 76L, 76R which are interposed between the end side inflation parts 74L, 74R and main body inflation part 67 and, in inflation completion, bend the end side inflation parts 74L, 74R to thereby project them backward from the main body inflation part 67.

In the main body inflation part 67, its lower end 67b side in inflation completion is formed as a narrow-width mounting portion 68 to be mounted on the case 21 side, while the portion thereof to be disposed above the mounting portion 68 in inflation completion is used as a lower limb protection portion 72 capable of protecting the driver D from the shins L to the knees K. The lower limb protection portion 72 is interposed between the lower panel 13b or steering column 8 and the knees or shins L of the driver D so as to cover the front of the driver D from the knees K to shins L in inflation completion. The lower limb protection portion 72 is structured such that the horizontal-direction side width dimension thereof increases toward the upper end 72a side, and the horizontal-direction side width dimension on the upper end 72a side for protecting the knees K is set for a dimension capable of covering the front of the left and right knees K (KL, KR) of the driver D. In the upper surface side portion (the portion of the back side wall 66b) of the mounting portion 68, similarly to the above air bag 40, there are formed two insertion holes 69 for projecting the bolts 36 of the retainer 34 therefrom, an open slit 70 for inserting the retainer 34 therethrough, and an insertion hole 71 capable of inserting a projection 22a formed in the bottom wall 22 of the case 21.

Figure 17:
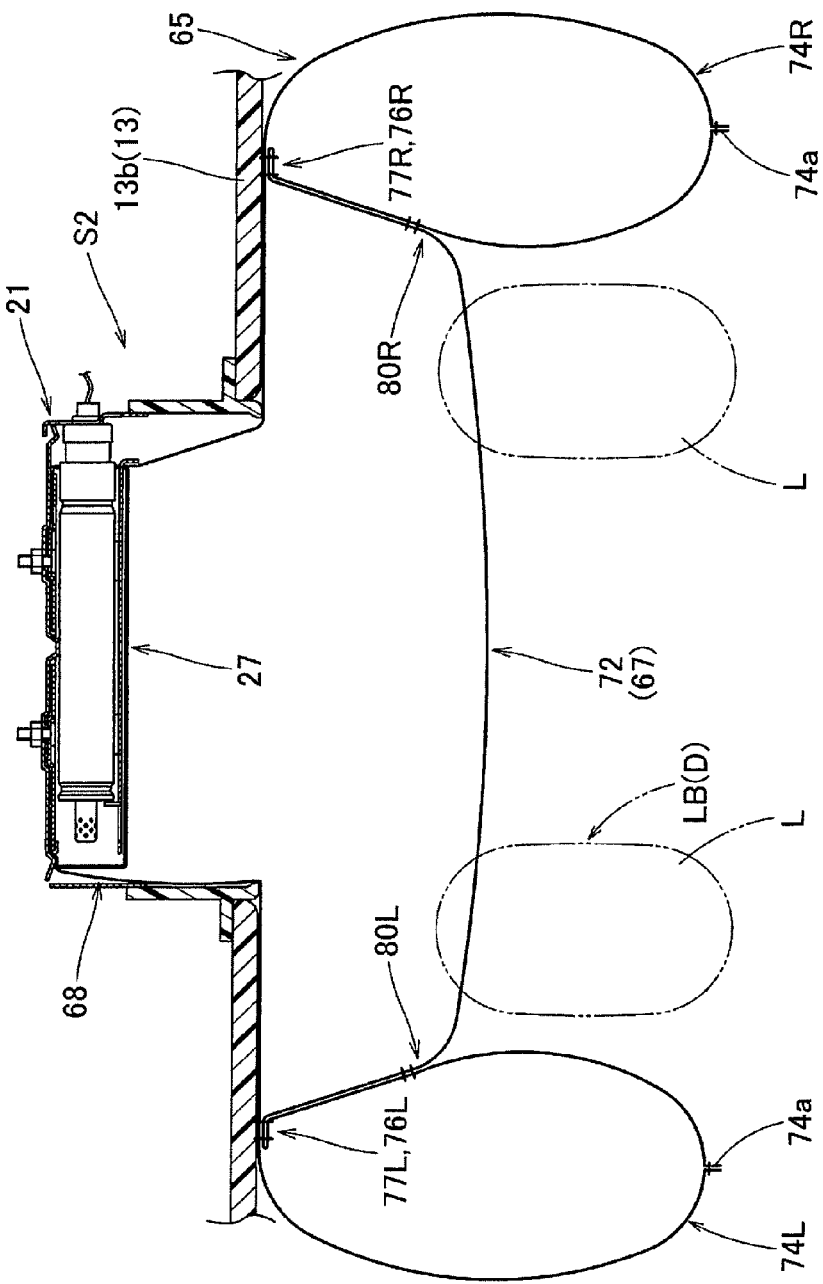
FIG. 17 is a schematic transverse section view of a lower limb protecting apparatus using the air bag of the second embodiment, showing the inflation completed state of the air bag.

The end side inflation parts 74L, 74R, in this embodiment, are disposed on the lower end side of the main body inflation part 67 in inflation completion and, when the bag main body 66 is developed flat, as shown in FIG. 12, respectively project leftward or rightward from the two left and right edges of the lower end side of the bag main body 66 (the portion on the lower end side of the mounting portion 68 and main body inflation part 67). That is, in the air bag 65 of this embodiment, the end side inflation parts 74L, 74R are formed to range leftward and rightward from the lower end 72b side portion of the lower limb protection part 72 for protecting the shins L. Specifically, in this embodiment, the end side inflation parts 74L, 74R are formed such that their ends range from the lower end 67b of the main body inflation part 67 (the lower end of the mounting portion 68). The end side inflation parts 74L, 74R, in inflation completion of the bag main body 66, are bent in the portions of the bending part 76L, 76R by the connecting portions 80L, 80R serving as the connecting elements to project backward from the main body inflation part 67 (lower limb protection part 72) with their tip ends 74a (the horizontal-direction outer ends in the flat developed state) directed backward (see FIGS. 13, 17). That is, the end side inflation parts 74L, 74R are arranged to cover the left and right outer sides of the shins L of the driver D seated in the driver seat in inflation completion of the bag main body 66, while the vertical-direction side and longitudinal-direction side (the horizontal-direction side in the flat developed state) dimensions thereof are set such that, when the driver D serving as an occupant seated in the driver seat is moved obliquely forward in the oblique collision or off-set collision of the vehicle, the shins L of the driver D can be protected properly.

The bending parts 76L, 76R for bending the end side inflation parts 74L, 74R to project backward from the main body inflation part 67 in inflation completion of the bag main body 66 are constituted of seam parts 77L, 77R interposed between the end side inflation parts 74L, 74R and main body inflation part 67. The seam parts 77L, 77R are formed by superimposing and connecting (by sewing using a sewing thread) together the front side wall 66a and back side wall 66b.

Figure 15:
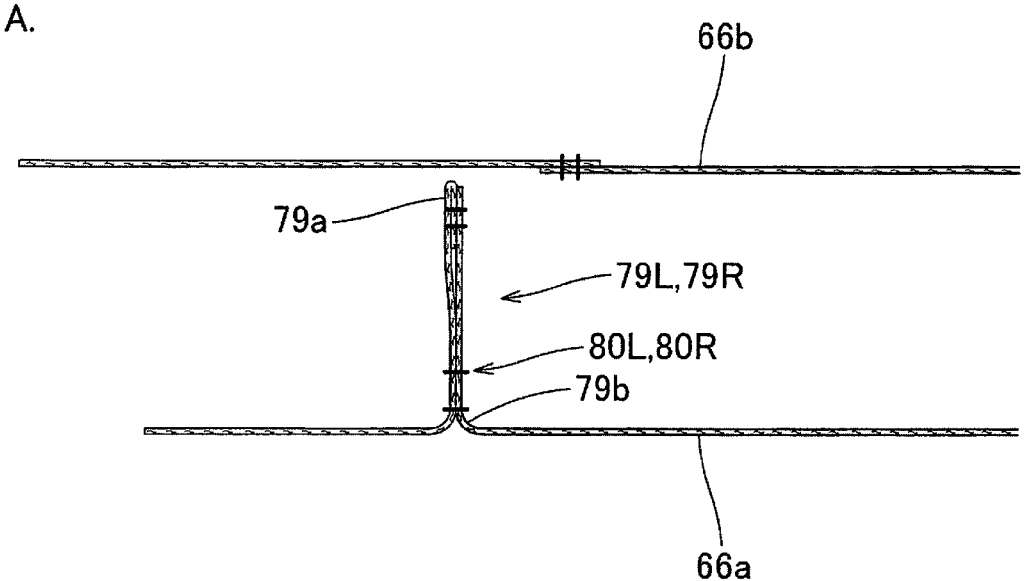
FIG. 15 is a schematic section view of the air bag of FIG. 11, explaining the procedure for forming the seam part and connecting portion.
Figure 15:
Figure 15:
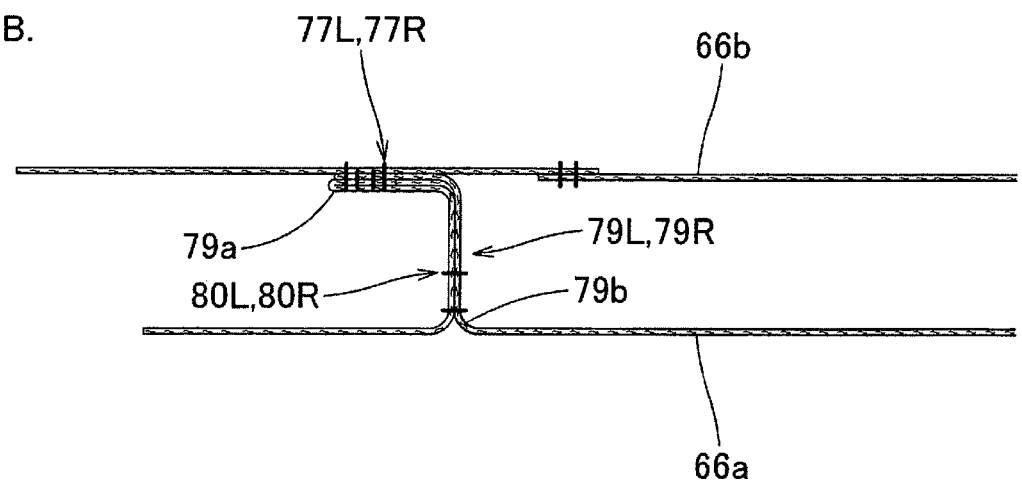

Specifically, in the bag main body 66 of this embodiment, in such area of the front side wall 66a as ranges from the portion the back inside areas of the end side inflation parts 74L, 74R to the portion constituting the main body inflation part 67, there are formed tuck parts 79L, 79R (see Section A of FIG. 15) by pinching such areas to project the same inwardly of the bag main body 66 while reducing the horizontal-direction width dimensions of such areas, the base 79b side portions of the tuck parts 79L, 79B are sewn (connected) together using a sewing thread and, while the tip end 79a side portions of the tuck parts 79L, 79R are directed horizontally outward, the tip end 79a side portions thereof are sewn (connected) to the back side wall 66b using a sewing thread (see Section B of FIG. 15). And, the portions of the tuck parts 79L, 79B connecting the tip end 79a side portions of the tuck parts 79L, 79R to the back side wall 66b constitute seam parts 77L, 77R for superimposing and connecting together the front side wall 66a and back side wall 66b. Parts, which have sewn together the base 79b side portions of the tuck parts 79L, 79R, constitute connecting parts 80L, 80R for connecting together the front side wall 66a of the main body inflation part 67 and the front side walls 66a of the end side inflation parts 74L, 74R with the seam parts 79L, 79R interposed between them; and, the connecting parts 80L, 80R constitute connecting elements for connecting together the end side inflation parts 74L, 74R and main body inflation part 67 with the bending part 76L, 76R (seam parts 77L, 77R) between them in such a manner that the bent states of the end side inflation parts 74L, 74R in inflation completion can be maintained.

Figure 14:
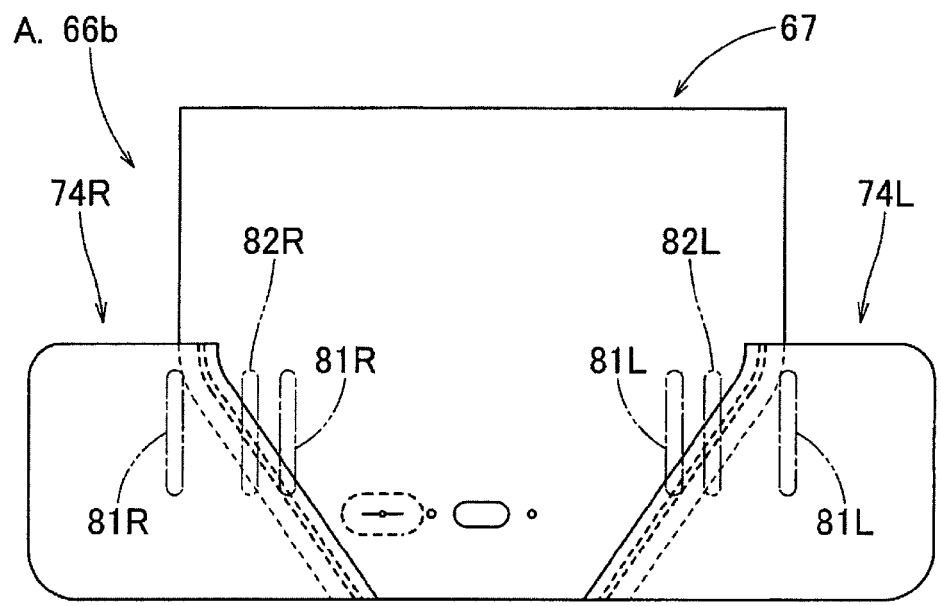
FIG. 14 is a plan view of a front side wall and a back side wall constituting the air bag of FIG. 11, showing a state where they are developed flat.
Figure 14:
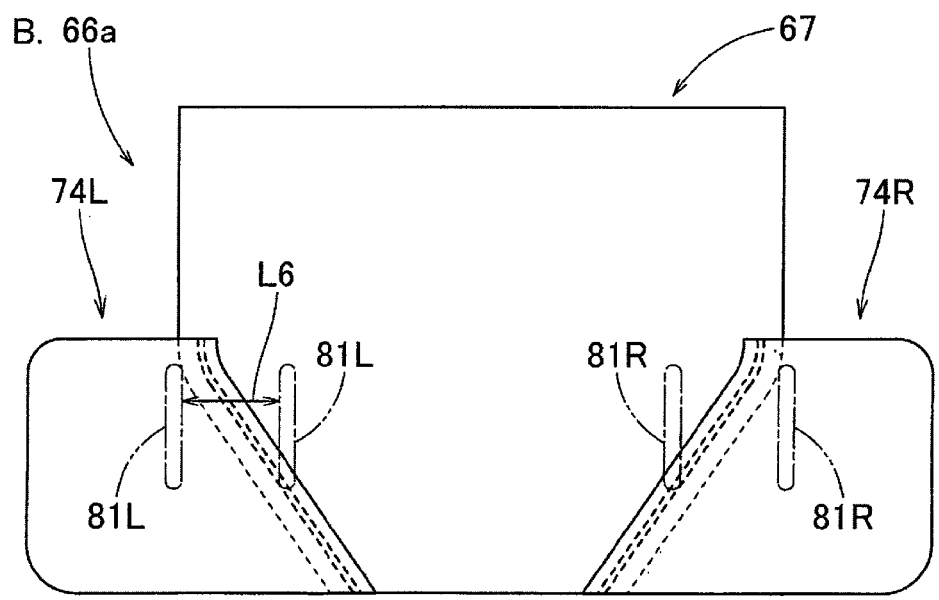

In the bag main body 66 of this embodiment, the connecting parts 80L, 80R sewing together the base 79b side portions of the tuck parts 79L, 79R and seam parts 77L, 77R, as shown by two-dot chain lines in FIG. 12, are respectively formed in a linear shape substantially extending along the longitudinal direction and are formed in the areas of the end side inflation parts 74L, 74R except for the front end side portions, while the length dimension thereof is set smaller than the longitudinal-direction side width dimension (in this embodiment, about ⅗) when the end side inflation parts 74L, 74R are developed flat. And, the end side inflation parts 74L, 74R, in the front end side areas thereof (areas serving as the right and left sides of the mounting portion 68) where the connecting parts 80L, 80R and seam parts 77L, 77R are not arranged, communicate with the main body inflation part 67 and receive inflation gas therein from the front end side areas. Also, in the front side wall 66a when it is developed flat alone before the inflation gas is supplied therein, the distance L6 (see Section B of FIG. 14) between connecting parts formation expected parts 81L, 81L, 81R and 81R for forming the connecting parts 80L, 80R (the pinching amount of the front side wall 66a by the tuck parts 79L, 79R) is set for a dimension which, in inflation completion of the bag main body 66, enables the end side inflation parts 74L, 74R to project backward greatly from the main body inflation part 67 with the bending parts 76L, 76R as the start points thereof while maintaining the bent states thereof relative to the main body inflation part 67. Further, in the back side wall 66b when it is developed flat alone before the seam parts 77L, 77R are formed, seam parts formation expected parts 82L, 82R for forming the seam parts 77L, 77R, as shown in Section A of FIG. 14, are formed between the connecting part formation expected parts 81L, 81L, 81R and 81R of the front side wall 66a. Here, in Section A of FIG. 14, the connecting parts formation expected parts 81L, 81L, 81R and 81R are shown by two-dot chain lines but, actually, in the back side wall 66b, the connecting part formation expected parts 81L, 81L, 81R and 81R are not formed. In this embodiment, the bag main body 66 is symmetric.

Figure 16:
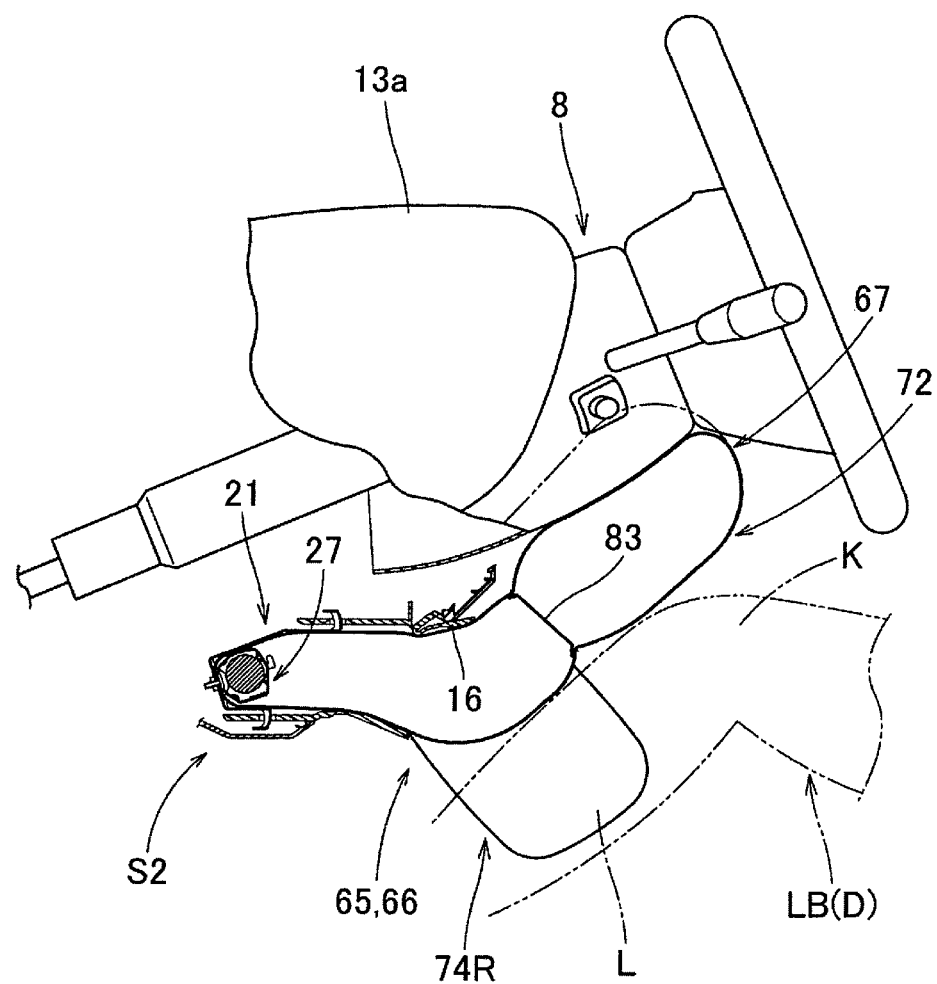
FIG. 16 is a schematic longitudinal section view of a lower limb protecting apparatus using the air bag of the second embodiment, showing the inflation completed state of the air bag.

In the air bag 65 as well, similarly to the air bag 40, within the bag main body 66, there is arranged the internal tether 83 for restricting the thickness in inflation completion (see FIGS. 11 and 12). The internal tether 83 is arranged to extend substantially along the horizontal direction in the lower end 72b side portion for covering the front of the shins L in inflation completion within the lower limb protection part 72 of the main body inflation part 67 of the bag main body 66 (see FIG. 16). The internal tether 83 is formed of a flexible belt-shaped sheet member and connects together the front side wall 66a and back side wall 66b to restrict the distance between the two walls in inflation completion, thereby preventing the area for protecting the shins L from inflating excessively thick.

The front side wall 66a, back side wall 66b and internal tether 83 constituting the bag main body 66, in this embodiment, are made of woven fabrics formed of flexible polyester threads, polyamide threads or the like. In this embodiment, as shown in FIGS. 12 to 14, in the front side wall 66a and back side wall 66b, the portions thereof constituting the end side inflation parts 74L, 74R are formed separately from the portions constituting the main body inflation part 67. The reason for this is to improve the yield of the base fabric of the air bag. However, of course, the front side and back side walls may also be formed while the end side and main body inflation parts are formed integrally.

The thus structured air bag 65, similarly to the air bag 40, can be mounted on the vehicle as an air bag apparatus S2.

In the air bag 65 of the air bag apparatus S2 of the second embodiment as well, in inflation completion, the end side inflation parts 74L, 74R disposed on the two left and right sides of the main body inflation part 67 are bent in the bending parts 76L, 76R portions so as to project backward from the main body inflation part 67 (see FIGS. 16 and 17), while the bent states thereof by the bending parts 76L, 76R are maintained by the connecting parts 80L, 80R serving as the connecting elements for connecting together the end side inflation parts 74L, 74R and main body inflation part 67. And, in the air bag 65 of the second embodiment as well, since the bending parts 76L, 76R are constituted of the seam parts 77L, 77R formed by superimposing and connecting together the front side wall 66a and back side wall 66b constituting the air bag 65 (bag main body 66), the end side inflation parts 74L, 74R can be bent greatly relative to the main body inflation part 67 with the bending parts 76L, 76R as the start points thereof. That is, in the air bag 65 as well, the end side inflation parts 74L, 74R, with the ends (tip ends 74a) thereof facing backward, can be projected backward greatly from the main body inflation part 67. Therefore, in the air bag 65 of the second embodiment as well, when the driver D serving as an occupant seated in the seat is moved obliquely forward in the oblique collision, off-set collision or the like of the vehicle, the lower limb LB of the driver D can be restricted properly by the end side inflation parts 74L, 74R. Specifically, in the air bag 65, since the end side inflation parts 74L, 74R are arranged on the two left and right sides of the lower end 72b side areas for protecting the shins L, in inflation completion of the air bag 65, the shins L of the obliquely forward moving driver D are restricted by the end side inflation parts 74L, 74R, thereby enabling restriction of the lower limb LB of the driver D.

Therefore, in the air bag 65 of the second embodiment as well, using a simple structure, in inflation completion, the tip ends 74a of the end side inflation parts 74L, 74R disposed on the two left and right sides thereof can be properly directed backward.

In the air bag 65 as well, in a front collision, the lower limb LB of the forward moving driver D can be properly protected by the lower limb protection part 72.

In the air bag 65, since the bending parts 76L, 76R are constituted of the seam parts 77L, 77R formed by superimposing and connecting together the front side wall 66a and back side wall 66b, even when the air bag is structured to be capable of covering the lateral sides of the lower limbs LB of the driver D in addition to the front side thereof, the volume thereof can be prevented from increasing and a compact inflator 27 having a small gas discharge amount can be used. This can prevent the apparatus S2 itself from increasing in size, thereby enabling smooth mounting thereof in a narrow mounting space.

In the air bag 65, since the connecting elements are constituted of the connecting parts 80L, 80R for connecting together the front side wall 66a and back side wall 66b in the main body inflation part 67 with the seam parts 77L, 77R between them, by connecting together the front side walls 66a, 66a for the end side inflation parts 74L, 74R and main body inflation part 67 using the connecting parts 80L, 80R, the substantial film length of the front side wall 66a in inflation completion of the air bag 65 can be made shorter than that of the back side wall 66b. The film length difference provides a mode in which the ends (tip ends 74a) of the end side inflation parts 74L, 74R face inward in the horizontal direction, thereby enabling the ends (tip ends 74a) of the end side inflation parts 74L, 74R to face backward properly. Also, in the air bag 65, when compared with the air bag 40 of the first embodiment, the amount of use of the base fabric can be reduced, thereby enabling reduction of manufacturing cost and weight of the air bag, and enabling compact folding thereof.

Further, in the air bag 65, since the end side inflation parts 74L, 74R are arranged on the two left and right sides of the main body inflation part 67, in both of oblique collisions from left front and from right front, the lower limbs LB of the driver D can be protected properly.

Figure 18:
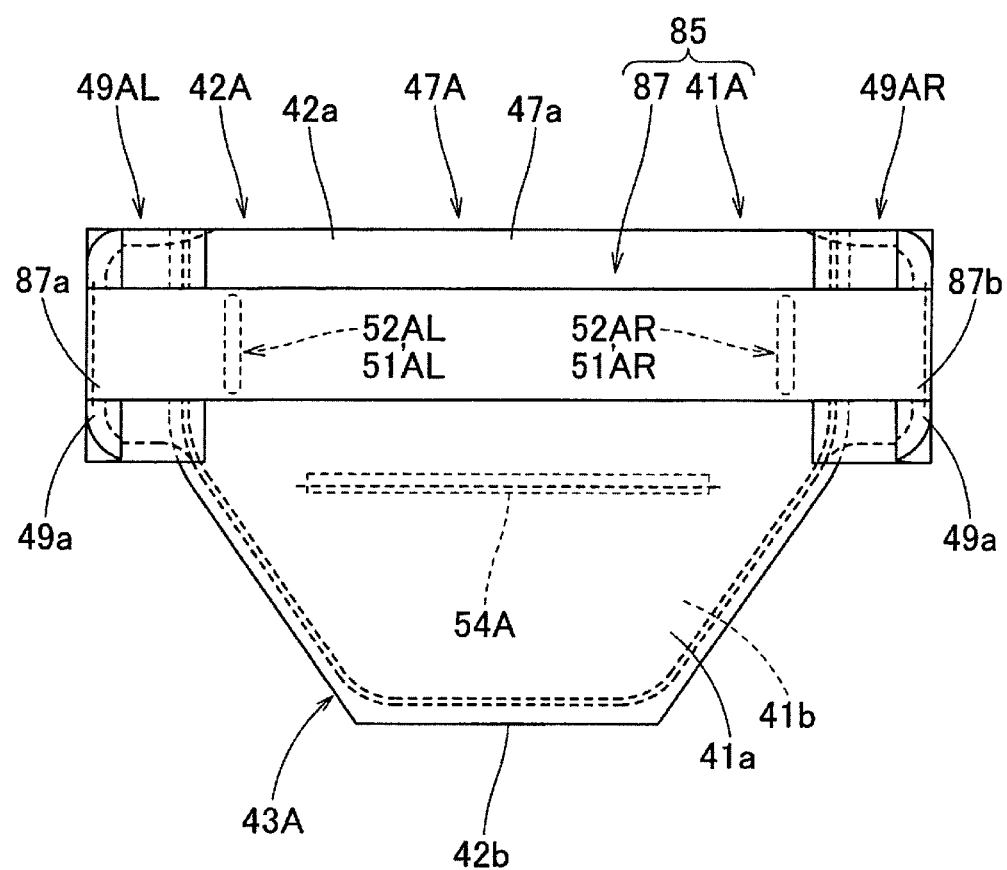
FIG. 18 is a bottom view of an air bag of a third embodiment.
Figure 19:
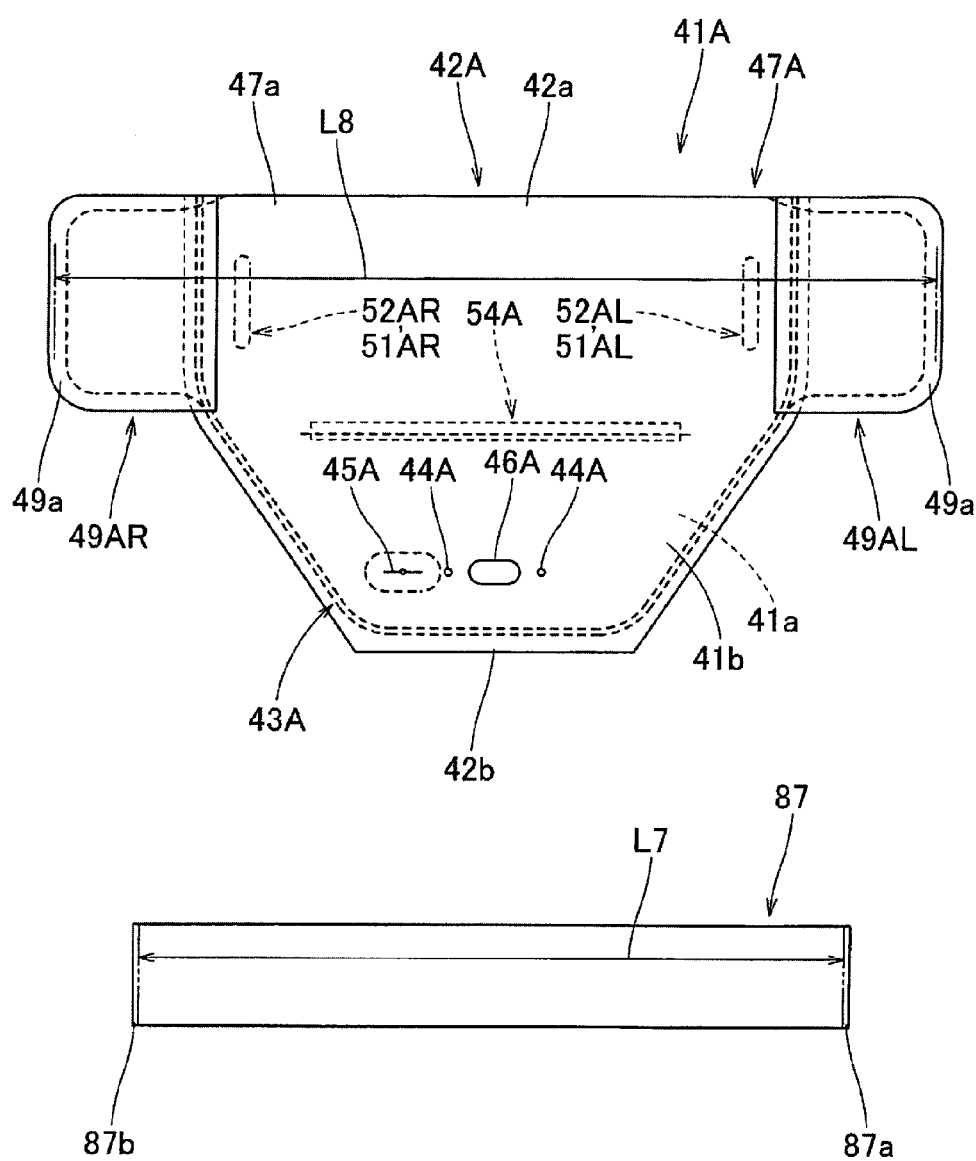
FIG. 19 is a plan view of the air bag of FIG. 18, showing a state where a bag main body and a tether are developed flat.

Next, description is given of an air bag 85 according to a third embodiment of the invention. The air bag 85, in this embodiment, as shown in FIGS. 18 and 19, includes a bag main body 41A inflatable when inflating gas is supplied therein, an internal tether 54A disposed within the bag main body 41A, and a tether 87 disposed on the outside of the bag main body 41A. In the air bag 54A, the bag main body 41A and internal tether 54A disposed within the bag main body 41A are the same in structure as the bag main body 41 and internal tether 54 of the air bag 40 of the first embodiment. In the same members, there is added "A" to the ends of the designations of the members and thus the specific description thereof is omitted.

The tether 87, which is formed of a flexible belt-shaped member, is arranged on the lower surface side (front side wall 41a side) of the bag main body 41A in inflation completion and connects together the tip ends 49a of end side inflation parts 49AL, 49AR such that the bent states of the end side inflation parts 49AL, 49AR relative to a main body inflation part 42A can be maintained. The longitudinal-direction side ends 87a, 87b of the tether 87 are respectively sewn to the ends (tip ends 49a) of the end side inflation parts 49AL, 49AR using sewing threads. The length dimension of the tether 87 is set for a dimension which, when the air bag 85 is developed and inflated, can inflate the bag main body 41A with no difficulty and, inflation completion of the bag main body 41A, can project the end side inflation parts 49AL, 49AR backward from the main body inflation part 42A with the bending parts 51AL, 51AR portions as the start points thereof while the bent states thereof relative to the main body inflation part 42A is maintained. Specifically, in this embodiment, the length dimension L7 of the tether 87 is set about ⅘ of the distance L8 between the tip ends 49a, 49a of the end side inflation parts 49AL, 49AR in the flat developed bag main body 41A (see FIG. 19). In the air bag 85 of this embodiment, in inflation completion, in a state before the lower limbs LB of the driver D are received, while the tether 87 is stretched, the end side inflation parts 49AL, 49AR are arranged inclined relative to the longitudinal direction with the tip ends 49a facing backward and horizontally outward (see FIG. 20). Here, the tether 87, similarly to the front side wall 41a and back side wall 41b constituting the bag main body 41A, is also made of a woven fabric formed of flexible polyester threads, polyamide threads or the like.

The thus structured air bag 85, similarly to the air bag 40, can be mounted on the vehicle as the air bag apparatus S3.

Figure 20:
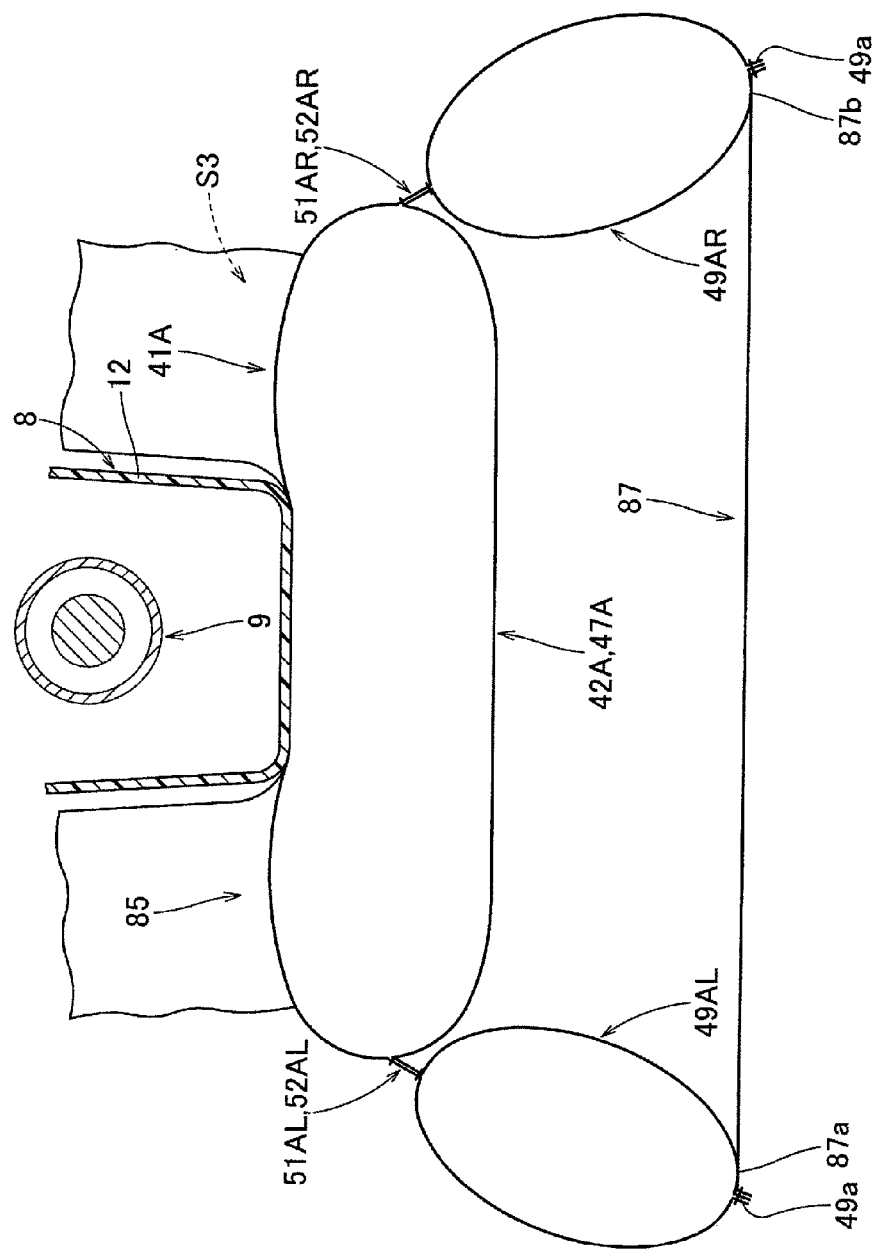
FIG. 20 is a schematic transverse section view of a lower limb protecting apparatus using the air bag of the third embodiment, showing the inflation completed state of the air bag.

In the air bag 85 of the air bag apparatus S3 as well, the end side inflation parts 49AL, 49AR disposed on the two left and right sides of the main body inflation part 42A in inflation completion of the air bag 85 are arranged inclined relative to the longitudinal direction by the tether 87 so arranged to connect together the ends (tip ends 49a) in such a manner that the ends (tip ends 49a) are directed toward the back of the vehicle while they are directed outward in the horizontal direction (see FIG. 20). In inflation completion of the air bag 85, when the lower limbs LB of the driver D moving forward toward the air bag 85 (in this embodiment, the knees K of the driver D) come into contact with the tether 87 disposed on the back side of the front side wall 41a, with further forward movement of the driver D, the ends 87a, 87b of the tether 87 are pulled horizontally inward and, following this, as shown in FIG. 21, the end side inflation parts 49AL, 49AR are also rotated with the bending parts 51AL, 51AR as the start points thereof, with the ends (tip ends 49a) facing horizontally inward. Thus, the end side inflation parts 49AL, 49AR are arranged to project backward further greatly from the main body inflation part 42A with the ends (tip ends 49a) facing backward to cover the left and right outsides of the lower limbs LB of the driver D, whereby the lower limbs LB of the driver D can be properly restricted by the end side inflation parts 49AL, 49AR.

Therefore, in the air bag 85 as well, while using a simple structure, in inflation completion, the tip ends 49a of the end side inflation parts 49AL, 49AR disposed on the two left and right end sides can be directed backward properly.

And, in the air bag 85, in a vehicle frontal collision, the lower limbs LB of the forward moving driver D can be protected properly by the lower protection part 47A.

Also, in the air bag 85, since the bending parts 51AL, 51AR are constituted of the seam parts 52AL, 52AR formed by superimposing and connecting together the front side wall 41a and back side wall 41b, even when the air bag employs a structure capable of covering the lateral sides of the lower limbs LB of the driver D in addition to the front side thereof, the volume of the air bag 85 can be prevented from increasing and a compact inflator 27 having a small amount of discharge of gas can be used. This can prevent the apparatus S3 from increasing in size, thereby enabling smooth mounting thereof in a narrow mounting space.

Further, in the air bag 85, since the end side inflation parts 49AL, 49AR are arranged on the two left and right sides of the main body inflation part 42A, in both of oblique collisions from left front and from left right, the lower limbs LB of the driver D can be protected properly. Here, in the air bag 85, the tip ends 49a of the end side inflation parts 49AL, 49AR are connected together by the belt-shaped tether 87; and, in this embodiment, when protecting the lower limbs LB of the driver D by the inflation-completed air bag 85, the lower limbs LB of the forward moving driver D are contacted with the tether 87 to pull forward the tether 87, whereby the end side inflation parts 49AL, 49AR are rotated with the base sides (bending parts 51AL, 51AR) as the start points thereof and are thereby so projected backward greatly toward the back side of the vehicle as to cover the left and right outsides of the lower limbs LB of the driver D. That is, in a state where inflation is completed simply, since the end side inflation parts 49AL, 49AR are not pulled in such a manner that the tip ends 49*a* are projected backward greatly from the main body inclination part 42A, even in a structure for connecting together the tip ends 49*a* by the tether 87, inflation can be completed smoothly with no difficulty.

Here, in the air bags 40, 65 and 85 of the embodiments, the end side inflation parts 49L, 49R, 49AL, 49AR, 74L and 74R are disposed on the two left and right sides of the main body inflation parts 42, 42A and 67. However, unless the above points are considered, the end side inflation part may also be formed at least in one of the horizontal-direction end sides of the main body inflation part.

Also, in the embodiments, description has been given of the air bag for use in the lower limb protecting air bag apparatus to be disposed in front of the driver seat. However, of course, the air bag of the invention can also apply to a lower limb protecting air bag apparatus to be disposed in front of an assistant driver seat and a lower limb protecting air bag apparatus to be disposed in front of a rear seat.

What is claimed is:

1. A lower limb protecting air bag, folded and stored in front of an occupant seated in a seat, with supply of inflating gas therein, inflatable to cover the front of the lower limbs of the occupant, comprising:
    a main body inflation part configured to cover the front of the lower limbs of the occupant in inflation completion;
    an end side inflation part disposed on at least one of the horizontal-direction ends of the main body inflation part;
    a bending part, interposed between the main body inflation part and the end side inflation part, configured to bend the end side inflation part to project backward from the main body inflation part in inflation completion; and
    a connecting part and a seam part configured to connect together the end side inflation part and the main body inflation part with the bending part between them so that the bent state of the end side inflation part in inflation completion is maintained, wherein:
    the main body inflation part and the end side inflation part are configured to inflate substantially in a plate shape to separate a front side wall disposed on an occupant side of the air bag and a back side wall disposed on a front side of the vehicle when the air bag is developed flat;
    the bending part includes the seam part formed by superimposing and connecting together the front side wall and the back side wall; and
    the connecting part and the seam part are provided at a tuck part interposed between the main body inflation part and the end side inflation part.

2. The lower limb protecting air bag according to claim 1, wherein
    the end side inflation part is arranged on both the left and right sides of the main body inflation part.

* * * * *